US010565486B2

(12) United States Patent
Pascua et al.

(10) Patent No.: US 10,565,486 B2
(45) Date of Patent: Feb. 18, 2020

(54) TAMPER EVIDENT SECURE PACK WITH ANCHORED CARD CARRIER

(71) Applicant: Travel Tags, Inc., Inver Grove Heights, MN (US)

(72) Inventors: Shelle B. Pascua, Sherwood, OR (US); Deborah Bartles, Vancouver, WA (US); David L. Williams, Prescott, WI (US); Ryan Madson, Golden Valley, MN (US); Steven C. Dunn, St. Louis Park, MN (US)

(73) Assignee: Travel Tags, Inc., North Mankato, MN (US)

( * ) Notice: Subject to any disclaimer, the term of this patent is extended or adjusted under 35 U.S.C. 154(b) by 924 days.

(21) Appl. No.: 14/813,940

(22) Filed: Jul. 30, 2015

(65) Prior Publication Data

US 2016/0031624 A1   Feb. 4, 2016

Related U.S. Application Data

(60) Provisional application No. 62/030,983, filed on Jul. 30, 2014.

(51) Int. Cl.
*G06K 19/06* (2006.01)
*B32B 7/06* (2019.01)
*B32B 7/12* (2006.01)

(52) U.S. Cl.
CPC .......... *G06K 19/06187* (2013.01); *B32B 7/06* (2013.01); *B32B 7/12* (2013.01); *B32B 2250/03* (2013.01); *B32B 2307/208* (2013.01); *B32B 2425/00* (2013.01); *B32B 2553/00* (2013.01)

(58) Field of Classification Search
CPC ... B29C 66/71; B29C 47/0021; B29C 65/028; B29C 65/04; B65D 73/00; B65D 73/0078; B65D 73/0028; B65D 75/20; B65D 75/30; B65D 75/566; B65D 2101/00; B65D 2203/06; B42D 15/025; B42D 25/285; B42D 25/00; G11B 33/0427; G11B 33/0422; G02B 27/2214; G06Q 20/363
USPC ...................... 206/308.1, 232, 459.5; 283/61; 229/92.8, 313, 84, 68.1, 71; 53/410, 412, 53/416, 492
See application file for complete search history.

(56) References Cited

U.S. PATENT DOCUMENTS

| 3,288,281 A | 11/1966 | Sparks |
| 3,773,251 A | 1/1973 | Hadick |
| 4,939,992 A | 7/1990 | Bird |

(Continued)

*Primary Examiner* — Chun Hoi Cheung
*Assistant Examiner* — Brijesh V. Patel
(74) *Attorney, Agent, or Firm* — Patterson Thuente Pedersen, P.A.

(57) ABSTRACT

A transaction card and carrier system. The system includes a panel assembly and transaction card assembly. The transaction card assembly includes a transaction card and one or more snap-off portions selectively detachable from the transaction card along a line of weakness. The transaction card assembly is anchored between at least two panels of the panel assembly along or within a seam or bind area formed by sealing the at least two panels together around or over the snap-off portion. At least one of the panels can further include one or more tamper indicating patterns, such as a starburst pattern. The transaction card assembly is adhered to the one or more tamper indicating patterns such that removal of the card ruptures the pattern.

28 Claims, 22 Drawing Sheets

(56) References Cited

U.S. PATENT DOCUMENTS

| | | | |
|---|---|---|---|
| 5,275,285 | A | 1/1994 | Clegg |
| 5,419,433 | A | 5/1995 | Harrer et al. |
| 5,489,123 | A | 2/1996 | Roshkoff |
| 5,493,801 | A | 2/1996 | James |
| 5,544,741 | A | 8/1996 | Fantone et al. |
| 5,588,526 | A | 12/1996 | Fantone et al. |
| 5,609,253 | A | 3/1997 | Goade, Sr. |
| 5,650,209 | A | 7/1997 | Ramsburg et al. |
| 5,760,381 | A * | 6/1998 | Stich .................. G06K 19/041 235/380 |
| 5,782,347 | A | 7/1998 | Fantone et al. |
| 5,791,474 | A | 8/1998 | Hansen |
| 5,833,068 | A | 11/1998 | Fantone |
| 5,850,913 | A | 12/1998 | Fantone et al. |
| 5,851,630 | A | 12/1998 | Davis, II |
| 5,918,909 | A | 7/1999 | Fiala et al. |
| 5,941,382 | A | 8/1999 | Fantone et al. |
| 5,975,302 | A * | 11/1999 | Young ........................ G09F 3/20 206/39 |
| 6,109,439 | A | 8/2000 | Goade |
| 6,145,665 | A * | 11/2000 | Krahn .................. B65D 5/4208 206/449 |
| 6,179,119 | B1 | 1/2001 | Manoogian |
| 6,224,108 | B1 | 5/2001 | Klure |
| 6,245,382 | B1 | 6/2001 | Shvartsman et al. |
| 6,315,206 | B1 * | 11/2001 | Hansen ................ A45C 11/182 235/380 |
| 6,328,341 | B2 | 12/2001 | Klure |
| 6,349,928 | B1 | 2/2002 | Ko |
| 6,439,613 | B2 | 8/2002 | Klure |
| 6,454,165 | B1 | 9/2002 | Dawson |
| 6,481,994 | B1 | 11/2002 | McCannel et al. |
| 6,520,329 | B1 | 2/2003 | Fuchs |
| 6,543,809 | B1 | 4/2003 | Kistner et al. |
| 6,588,591 | B1 | 7/2003 | Schabert et al. |
| 6,588,658 | B1 * | 7/2003 | Blank .................. G06Q 20/342 235/379 |
| 6,601,415 | B2 | 8/2003 | Takinami |
| 6,640,974 | B2 | 11/2003 | Malone |
| 6,715,795 | B2 * | 4/2004 | Klure .................. B42D 15/025 206/38 |
| 6,957,737 | B1 | 10/2005 | Frederickson et al. |
| 6,964,810 | B2 | 11/2005 | McCannel et al. |
| 7,117,512 | B1 | 10/2006 | Cahill |
| 7,219,829 | B2 | 5/2007 | Treat |
| 7,222,797 | B2 | 5/2007 | Davilla et al. |
| 7,300,535 | B2 | 11/2007 | McCannel et al. |
| 7,494,056 | B2 * | 2/2009 | Sturm .................. G06Q 20/349 235/380 |
| 7,537,168 | B2 | 5/2009 | Anderson et al. |
| 7,607,574 | B2 * | 10/2009 | Kingsborough ............................ G06K 19/06018 235/375 |
| 7,607,575 | B2 | 10/2009 | Kingsborough et al. |
| 7,628,282 | B2 | 12/2009 | Hardy |
| 7,681,732 | B2 | 3/2010 | Moehlenbrock et al. |
| 7,726,477 | B1 | 6/2010 | Gaither |
| 8,181,789 | B1 * | 5/2012 | Casella ................ A45C 11/182 206/39.7 |
| 8,292,072 | B2 * | 10/2012 | Corey .................. B42D 15/085 206/311 |
| 8,419,889 | B2 | 4/2013 | Smith |
| 8,523,078 | B2 | 9/2013 | Biskupski |
| 8,617,673 | B1 | 12/2013 | Desai et al. |
| 8,720,786 | B2 | 5/2014 | Boge et al. |
| 8,807,332 | B1 * | 8/2014 | Pascua ................ A45C 11/182 206/39 |
| 2002/0088855 | A1 | 7/2002 | Hodes |
| 2002/0157973 | A1 | 10/2002 | Preisler |
| 2003/0004889 | A1 | 1/2003 | Fiala et al. |
| 2003/0018586 | A1 | 1/2003 | Krahn |
| 2003/0028439 | A1 | 2/2003 | Cox |
| 2003/0080013 | A1 | 5/2003 | Smith |
| 2003/0150762 | A1 | 8/2003 | Biller |
| 2003/0234191 | A1 | 12/2003 | Belden, Jr. et al. |
| 2004/0008613 | A1 | 1/2004 | Beckwith et al. |
| 2004/0139318 | A1 | 7/2004 | Fiala et al. |
| 2004/0151880 | A1 | 8/2004 | Nakamura et al. |
| 2005/0045503 | A1 | 3/2005 | Wong et al. |
| 2005/0199516 | A1 | 9/2005 | Laarman |
| 2005/0205442 | A1 | 9/2005 | Spagna |
| 2005/0279143 | A1 | 12/2005 | Belden, Jr. et al. |
| 2005/0279825 | A1 * | 12/2005 | Ashby .................. B65D 27/14 235/380 |
| 2006/0207896 | A1 | 9/2006 | Shiga |
| 2006/0256413 | A1 | 11/2006 | Kitamura |
| 2007/0144044 | A1 | 6/2007 | Kershner et al. |
| 2007/0278114 | A1 | 12/2007 | Kane et al. |
| 2008/0030864 | A1 | 2/2008 | Gougeon et al. |
| 2008/0088126 | A1 | 4/2008 | Hoffman |
| 2008/0088931 | A1 | 4/2008 | Hoffman |
| 2008/0116089 | A1 | 5/2008 | Roberts |
| 2008/0150174 | A1 | 6/2008 | Raymond et al. |
| 2008/0213528 | A1 | 9/2008 | Hoffman |
| 2008/0237317 | A1 * | 10/2008 | Rosendall .......... B65D 73/0042 229/102 |
| 2009/0078590 | A1 | 3/2009 | Smith |
| 2009/0091123 | A1 * | 4/2009 | Conley .............. B65D 73/0078 283/106 |
| 2009/0107862 | A1 * | 4/2009 | Pascua .................. B65D 75/14 206/232 |
| 2009/0277808 | A1 | 11/2009 | Payne |
| 2010/0193583 | A1 | 8/2010 | Tartavull et al. |
| 2010/0213092 | A1 | 8/2010 | Swain |
| 2010/0326011 | A1 | 12/2010 | Norling et al. |
| 2011/0031148 | A1 * | 2/2011 | Rosendall .......... B65D 73/0028 206/459.1 |
| 2011/0132783 | A1 | 6/2011 | Williams et al. |
| 2011/0203722 | A1 * | 8/2011 | Smith .................... B65D 75/26 156/182 |
| 2012/0145578 | A1 * | 6/2012 | Pazlar ................ B65D 73/0078 206/459.5 |
| 2012/0256006 | A1 * | 10/2012 | Schmitt .................. B65D 75/28 235/493 |
| 2013/0068642 | A1 | 3/2013 | Corey et al. |
| 2013/0248406 | A1 * | 9/2013 | Glinert .................... B65B 11/52 206/497 |
| 2014/0076978 | A1 | 3/2014 | Smith et al. |
| 2014/0116908 | A1 * | 5/2014 | Beyer ...................... B65D 1/00 206/449 |
| 2014/0262872 | A1 | 9/2014 | Helm |
| 2015/0353237 | A1 | 12/2015 | Haedt et al. |
| 2016/0031624 | A1 | 2/2016 | Pascua et al. |

* cited by examiner

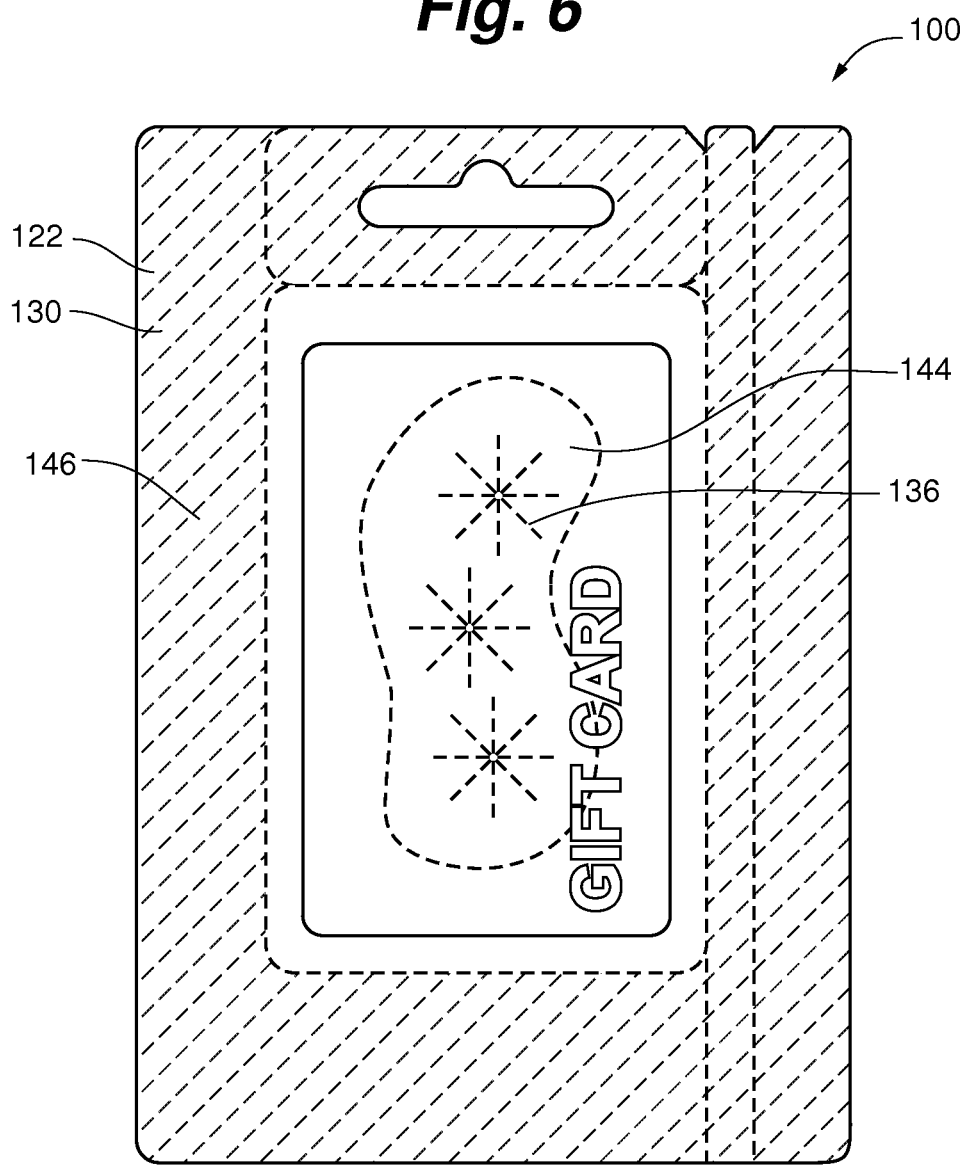

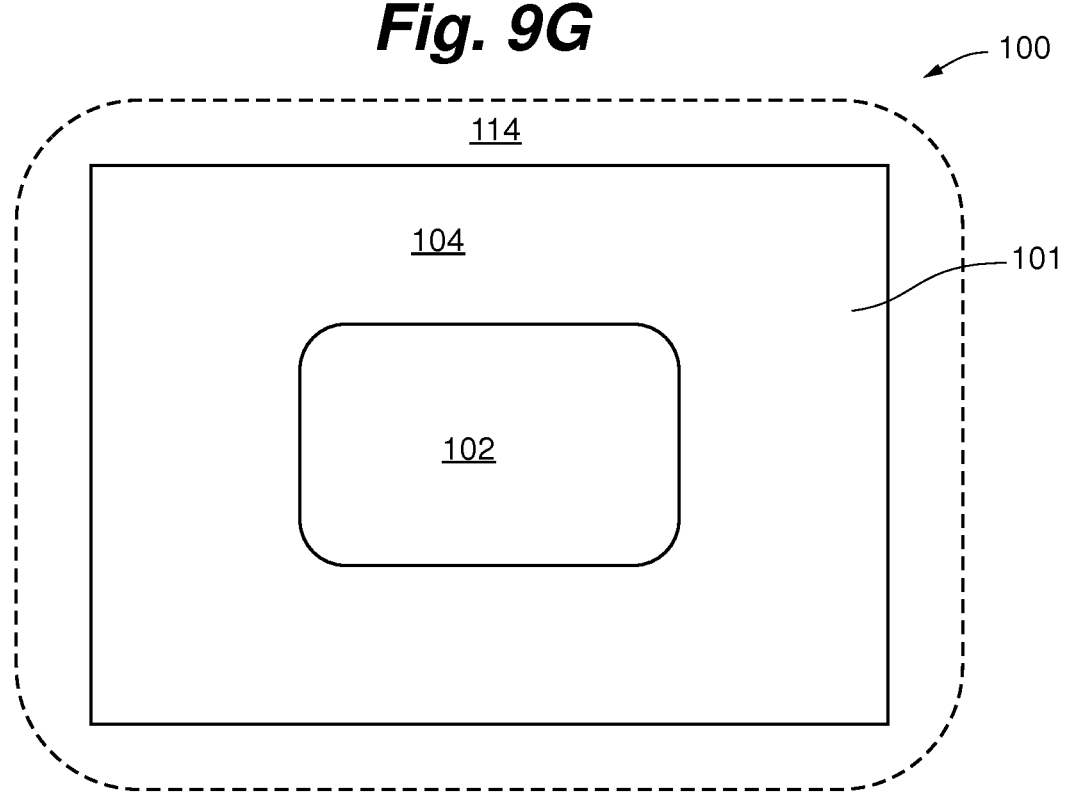

TAMPER EVIDENT SECURE PACK WITH ANCHORED CARD CARRIER

RELATED APPLICATION

The present application claims the benefit of U.S. Provisional Application No. 62/030,983 filed Jul. 30, 2014, which is hereby incorporated herein in its entirety by reference.

TECHNICAL FIELD

The present disclosure generally relates to the packaging of transaction cards such as gift cards, debit cards, credit cards, and the like. More particularly, the present disclosure relates to secure packaging of transaction cards to reduce the occurrence of card theft.

BACKGROUND

Stored value cards and transaction cards, such as, for example, debit cards, credit cards, gift cards, prepaid cards, shopping cards or fare cards, loyalty cards, among other names, are very popular with both consumers and retailers. For sake of simplicity, such cards are herein referred to as "transaction cards." The wide appeal of transaction cards, as a result, has attracted the unwelcome attention of criminals seeking to exploit the conveniences and automated processes afforded by such cards. In particular, such criminals misappropriate and manipulate transaction cards and associated account information to perform fraudulent transactions.

These transaction cards can be of any size or shape. For example, transaction cards can include dimensions of a conventional credit card, amongst a variety of other shapes and sizes. The transaction card can include, for example, any combination of a machine and/or human readable indicia such as a magnetic stripe, bar code, QR code, or other activation indicia, account identifying element such as an account number, or means for using the card. The stripe, code, account identifying element, etc. on the card is encoded with data, which includes a unique account number. The account identifying element, for example, may be visible while the card is secured in or secured to packaging, such that the account identifying element may be used during the purchase and activation of the card. Additionally or alternatively, the transaction card can comprise a smart card, otherwise known as a chip card or integrated circuit card, which includes one or more embedded integrated circuits. Smart cards can provide near field communications capabilities, identification, authentication, data storage and/or application processing, while providing strong security authentication.

Commonly, transaction cards, which may be open loop (accepted by more than one merchant) or closed loop (accepted by specific merchant only), are displayed by retailers for purchase by customers. The cards are stored in an inactive state and in that state cannot be used to purchase goods or services. A customer can have a card activated by bringing a card to a cashier and having the cashier then activate the card by various means, including without limitation, swiping the magnetic stripe, scanning the bar code, reading the radio frequency identification (RFID) tag, keying in the activation indicia at a point of sale terminal, and/or activating an embedded chip, any of which may add value to the card in exchange for payment, activate value already on the card, or link the card to a metered account. Alternatively, "live" cards can be displayed for purchase within a retail environment in which they are already in an active state such that they do not need to be activated for use.

In either the case, a balance on the card may be maintained within a computer system located at the point of sale or at a remote location. A holder of the transaction card may then use the card to purchase goods and/or services immediately or over time up to the value of the card or continuously if the card is associated with a dynamically active account such as a checking account or a reloadable account. The current display options relating to transaction cards, although providing convenience to consumers, leave the cards vulnerable to criminals.

Fraud that is perpetuated by criminals with regard to transaction cards can include, for example, card counterfeiting and "skimming." Counterfeiting can include, for example, card swapping, in which a fraudulent card is swapped for the legitimate card without the consumer or retailer's knowledge. Upon activation of the package or if the card is displayed in the active state, the legitimate card is now in the hands of the perpetrator and is usable, while the card remaining in the package is not, resulting in loss to both the retailer and the consumer.

Skimming also causes a serious problem resulting in significant loss to both retailers and consumers. To skim a card having a magnetic stripe holding account information, for example, a perpetrator will purchase a transaction card from a retailer, thereby causing an account associated with the card to become activated. The perpetrator will then remove additional cards from the store that have not yet been activated, and will then alter magnetically stored information on the inactivated cards to match that of the activated card. As such, all of the altered, inactivated cards will have the magnetic information that identifies the account of the originally purchased card. The perpetrator will then return the altered cards to the store shelf where unsuspecting customers seeking to purchase a transaction card will unknowingly place money into the account of the perpetrator holding the originally purchased card. The unsuspecting customer may attempt to use their card and will be told that it has no associated value or has a smaller value than thought. The retailer may be able to verify that the customer did not use the value associated with the transaction card, and in the interest of customer service, may restore the value to the customer. In that case, the retailer loses the money. However, in some cases, there may be no way to prove fraud and the customer may lose the entire value.

Where the magnetically stored information associated with a card is covered or hidden from view when secured in or to its packaging, the card typically must be removed from its packaging before the magnetically stored information can be altered. Thus, there is a need for a way to protect such cards and insure that they have not been removed from their packaging, or otherwise tampered with, prior to purchase or activation by an innocent consumer.

There have been proposals and attempts to reduce the occurrence of fraud associated with transaction cards. For example, modifications to card readers or other parts of the activation process have been proposed, but changing existing systems in such ways involves significant cost. Additional steps have been added to the activation process for some cards, such as steps involving pin numbers and web access. However, additional steps reduce the level of convenience that such cards provide to consumers.

Overall, what is needed in the industry is a way to prevent or reduce the occurrence of fraud relating to transaction cards which is effective, and inexpensive to implement, while at the same time not negating the convenience of transaction cards.

SUMMARY OF THE DISCLOSURE

Embodiments of the invention address many aspects of the aforementioned needs of the industry. One embodiment of the present disclosure provides tamper evident packaging for a transaction card that requires a user to separate an inactive or active transaction card from a card carrier or snap-off portion made of the same or different material coupled to and separable from one or more sides of the transaction card along a perforated line in order to remove the transaction card from the packaging.

Another embodiment of the present disclosure provides tamper evident packaging for a transaction card, wherein an inactive or active transaction card, with or without a separable portion, is affixed to a weakened panel of the packaging, such that removal of the card from the weakened panel permanently destroys the weakened panel. In these embodiments, retailers and consumers will be become alerted to prior tampering or removal of the inactive transaction card from its packaging by the damage caused to the packaging by the act of tampering or removal; moreover, implementation is inexpensive and does not negate the convenience of transaction cards.

One embodiment of the present disclosure provides a transaction card and carrier assembly. The carrier assembly includes at least one inactive or active transaction card, at least one card carrier or snap-off portion coupled to the at least one card, and at least two panels. The at least two panels can be discrete panels adhered, bonded, or heat sealed together, or can be a single substrate folded over on itself and adhered, bonded, or heat sealed to itself. The snap-off portion can be formed from the same or different material as the transaction card, and is selectively detachable from the transaction card along a line of weakness. The transaction card and snap-off portion can be positioned between at least two panels, wherein the at least two panels are affixed to one another thereby defining one or more seams or bind areas. The seam fixes the snap-off portion in position relative to the at least two panels, such that the snap-off portion is at least partially embedded in the seam or bind area between the at least two panels. The seam or bind area can also optionally circumscribe at least a portion of the perimeter of the transaction card.

In embodiments, the snap-off portion can be coupled to any edge of the transaction card. For example, the snap-off portion can be coupled to a longitudinal or long edge and/or a lateral or short edge of a rectangular transaction card. In one embodiment, the snap-off portion is coupled to a short edge of the transaction card, and can optionally include one or more hanging apertures. In another embodiment, the snap-off portion is coupled to a long edge of the transaction card, and optionally on a same side as a magnetic stripe, such that the transaction card is not swipeable or machine readable unless the snap-off portion is removed.

In some embodiments, the snap-off portion is coupled to multiple edges, such as an L-shaped snap-off portion coupled to adjacent edges of a card. In other embodiments, the system includes multiple snap-off portions, each of which are coupled to a different edge of the transaction card. In other embodiments, the card is either partially or entirely contained within or embedded within the snap-off portion. In one non-limiting example, the card is entirely bordered by the snap-off portion, and all four sides of the snap-off portion are bound or sealed into the seams of the panels.

In other embodiments, other cards, FOBs, or other transaction items are coupled to at least one of the transaction card and the card carrier. In one non-limiting example, one or more additional cards or fobs are removably coupled to an edge of the transaction card opposite the edge of the card coupled to the snap-off portion.

In an alternative embodiment, the transaction card is adhesively coupled to a card carrier as an alternative to the card carrier comprising one or more snap-off portions. Similar to above, at least a portion of the card carrier is sandwiched or bound to the panels.

In embodiments in which a magnetic stripe is positioned on the transaction card and extends proximate an edge of the transaction card, the snap-off portion can include an extension of the magnetic stripe. In one embodiment, the magnetic stripe extending onto the snap-off portion does not include any data.

In one embodiment, at least one of the two panels includes one or more tamper indicating patterns, such as die cut or perforated pattern, each pattern representing a series of multi-directional or uni-directional slits formed in the panel. In this embodiment, the transaction card is adhered to the at least one panel at the tamper indicating patterns. Thereafter, if the transaction card is removed from the panel, the structural weakening of the panel from the patterns will cause the panel to tear when the card is pulled in any direction. In one particular embodiment, the one or more patterns form a starburst pattern comprising a plurality of radial slits.

The above summary of embodiments of the invention is not intended to describe each illustrated embodiment or every implementation of the present invention. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 6 is a plan view of a carrier assembly showing hidden lines in accordance with an embodiment of the disclosure.

FIGS. 9A-9J are front plan views of transaction cards with snap-off portions in accordance with embodiments of the disclosure.

Figure 1:
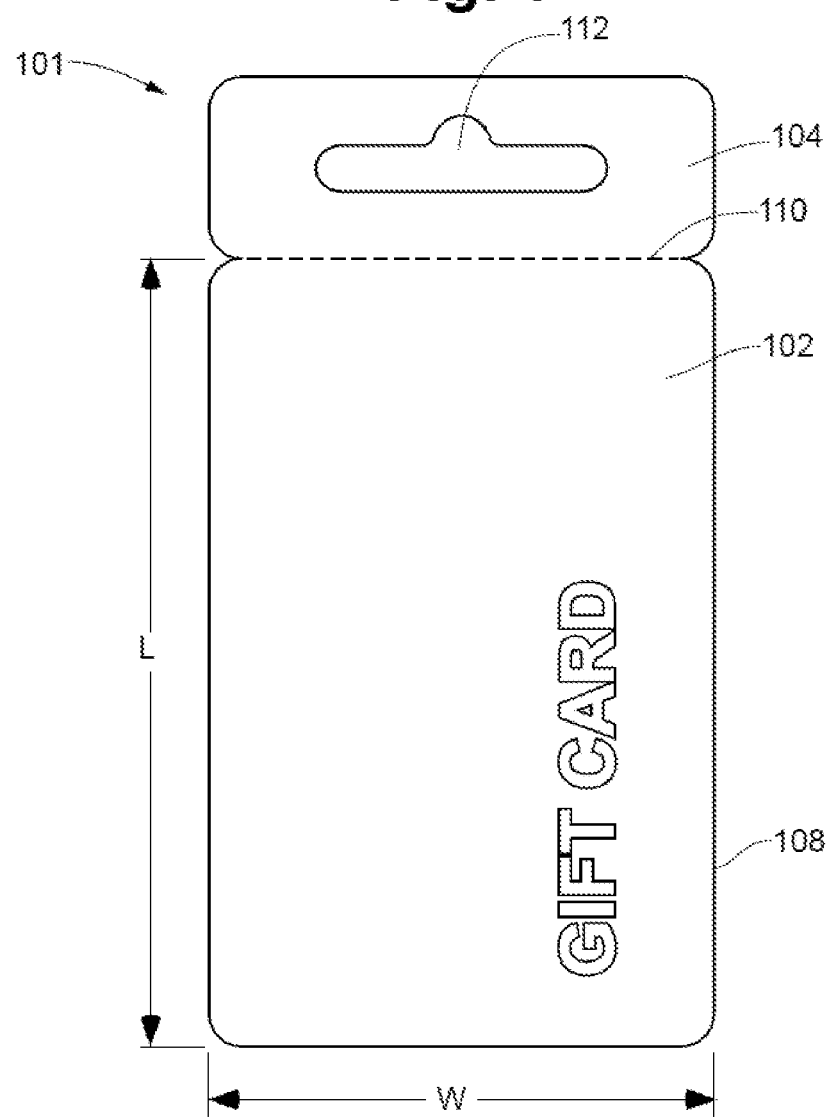
FIG. 1 is a front plan view of a transaction card coupled to a snap-off portion by a line of weakness in accordance with an embodiment of the disclosure.
Figure 2:
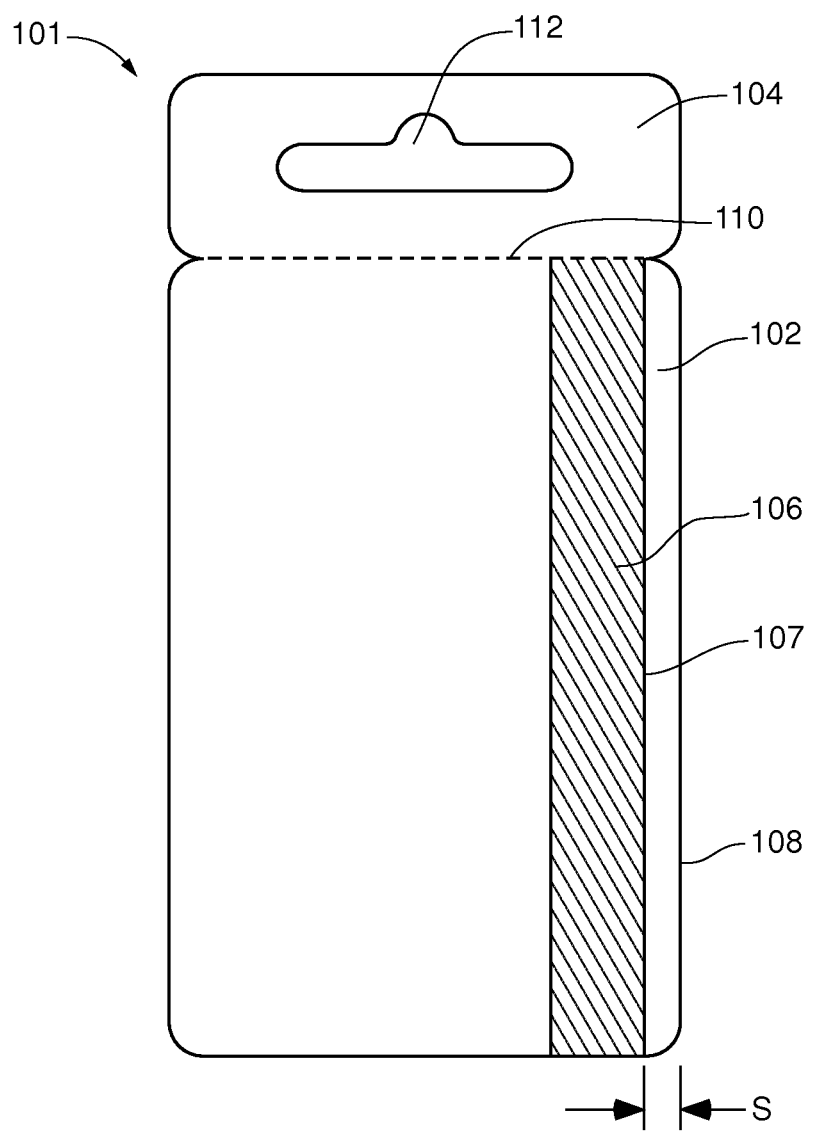
FIG. 2 is a rear plan view of the transaction card and snap-off portion of FIG. 1.

While the invention is amenable to various modifications and alternative forms, specifics thereof have by shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to the Figures, a card carrier assembly 100 generally includes a transaction card assembly 101 anchored and secured within a panel assembly 114. Card carrier assemblies 100 according to embodiments described herein provide visual indications of the removal or attempted removal of transaction card assembly 101 from panel assembly 114.

Referring to FIGS. 1 and 2, and 9A-9J the front and back of an active or inactive transaction card assembly 101 according to various embodiments are respectively shown. Transaction card assembly 101 comprises one or more transaction cards 102 and removable or snap-off portion 104. In one non-limiting embodiment, transaction card 102 can be a conventional or standard rectangular CR-80 card. In this non-limiting example, the face of inactive transaction card 102 can a length L substantially equal to 3.375 inches and a width W equal to substantially 2.125 inches. A magnetic stripe 106, if present, can positioned so that its lower edge is spaced S approximately 0.223" from the edge 108 of transaction card 102. Magnetic stripe 106 can be positioned so that its upper edge 107 is spaced at either 0.443" or 0.553" from the edge 108 of transaction card 102, depending, respectively, on whether the magnetic stripe 108 includes two tracks or three tracks. However, any of a variety of configurations and sized can also be contemplated, such as key fobs, cards without magnetic stripes, etc.

In one embodiment, transaction card 102 is removably coupled to snap-off portion 104. For example, transaction card 102 and snap-off portion 104 can be made out of the same substrate or integrally formed from a single sheet of material. In one embodiment, transaction card 102 and snap-off portion 104 can be made out of one or more plastic materials (filled or unfilled, and virgin and/or recycled) such as polystyrene polyvinyl chloride (PVC), polyethylene terephthalate (PET), polyethylene terephthalate glycol-modified (PETG), acrylonitrile butadiene styrene (ABS), polylactic acid (PLA), polypropylene (PP), or polyethylene (PE), a paper or synthetic paper material, such as a TESLIN sheet, bamboo, or a combination thereof, such as laminated paper or other natural or synthetic materials and combinations thereof. Transaction card 102 can be selectively detachable from snap-off portion 104 at a line of weakness 110. The line of weakness 110 can be formed by scoring, perforating, die cutting, or any other manner as is well known in the art. Snap-off portion 104 is bonded into a seam or bind area of panel assembly 114, as discussed in more detail below.

In another embodiment, transaction card 102 is formed from a laminated sheet material. A portion of the lamination sheet extends beyond the perimeter of the card and defines the snap-off portion 104. This snap-off portion 104 is bonded into a seam or bind area of panel assembly 114, as discussed in more detail below. As in the above embodiment, transaction card 102 can be selectively detachable from snap-off portion 104 at a line of weakness 110. The line of weakness 110 can be formed by scoring, perforating, die cutting, or any other manner as is well known in the art.

In yet another embodiment, transaction card 102 is made of a substrate separate from snap-off portion 104. The card substrate can be the same or different material, described above, than the snap-off portion substrate. In this embodiment, transaction card 102 is removably and optionally destructively coupled to the snap-off portion 104 by adhesive, fugitive glue, adhesive tape, friction fit (tabs, slits, etc.) or any of a variety of attachment mechanisms. Snap-off portion 104 is bonded into a seam of panel assembly 114, as discussed in more detail below.

Snap-off portion 104 can comprise any of a variety of shapes, as shown in FIGS. 9A-9J, including, but not limited to, domed, rectangular, irregular, squared, or any of a variety of shapes. Snap-off portion 104 can be coupled to a short or lateral side of card 102 (e.g. FIGS. 9A-9D), and/or a long or longitudinal side of card 102 (e.g. FIGS. 9E and 9F).

Figure 9A:
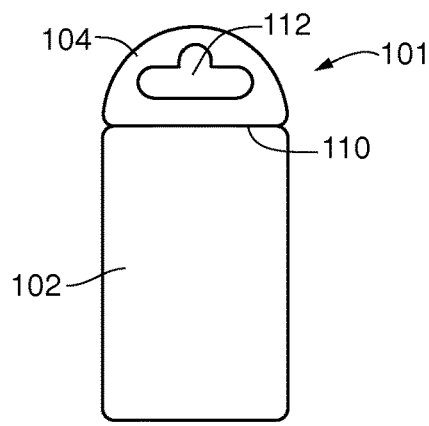
Figure 9B:
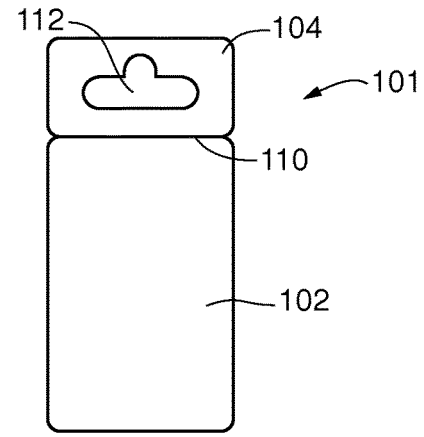
Figure 9C:
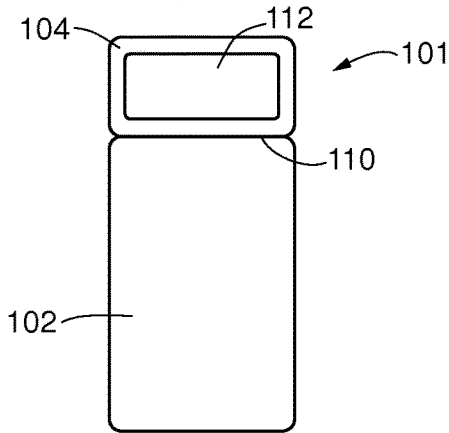
Figure 9D:
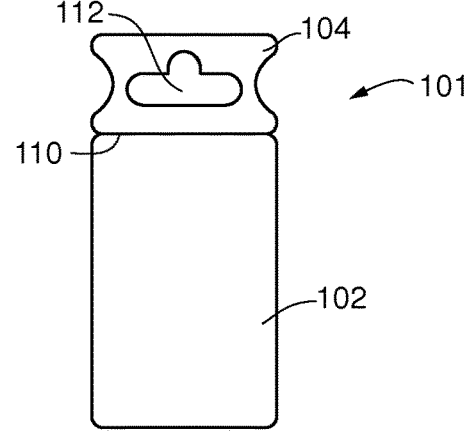
Figure 9E:
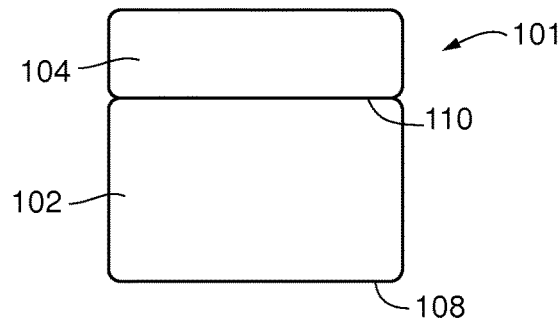
Figure 9F:
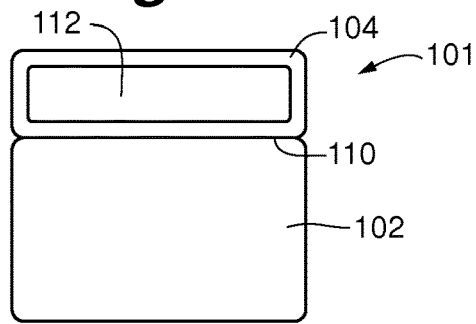

In one embodiment, transaction card 102 can include an aperture 112 that enables card assembly 101 to be displayed from a display peg, hook, or similar device. Aperture 112 can comprise any of a variety of shaped apertures, such as, for example, a sombrero-shaped hanging aperture as shown in FIGS. 1, 2, 9A, 9B, and 9D, or can comprise an opening similar in shape to the shape of snap-off portion 104, as shown in FIGS. 9C and 9F. In an alternative embodiment, as shown in FIG. 9E, no aperture is present.

In alternative embodiments not shown, the transaction card assembly includes multiple snap-off portions coupled to one or more edges of the transaction card. For example, a first snap-off portion can be coupled to a first side of the card and a second snap-off portion can be coupled to a second side of the card adjacent to and/or opposite of the first side. The plurality of snap-off portions can be similar or the same shape, or can have different shapes from one another, with or without apertures.

Figure 9H:
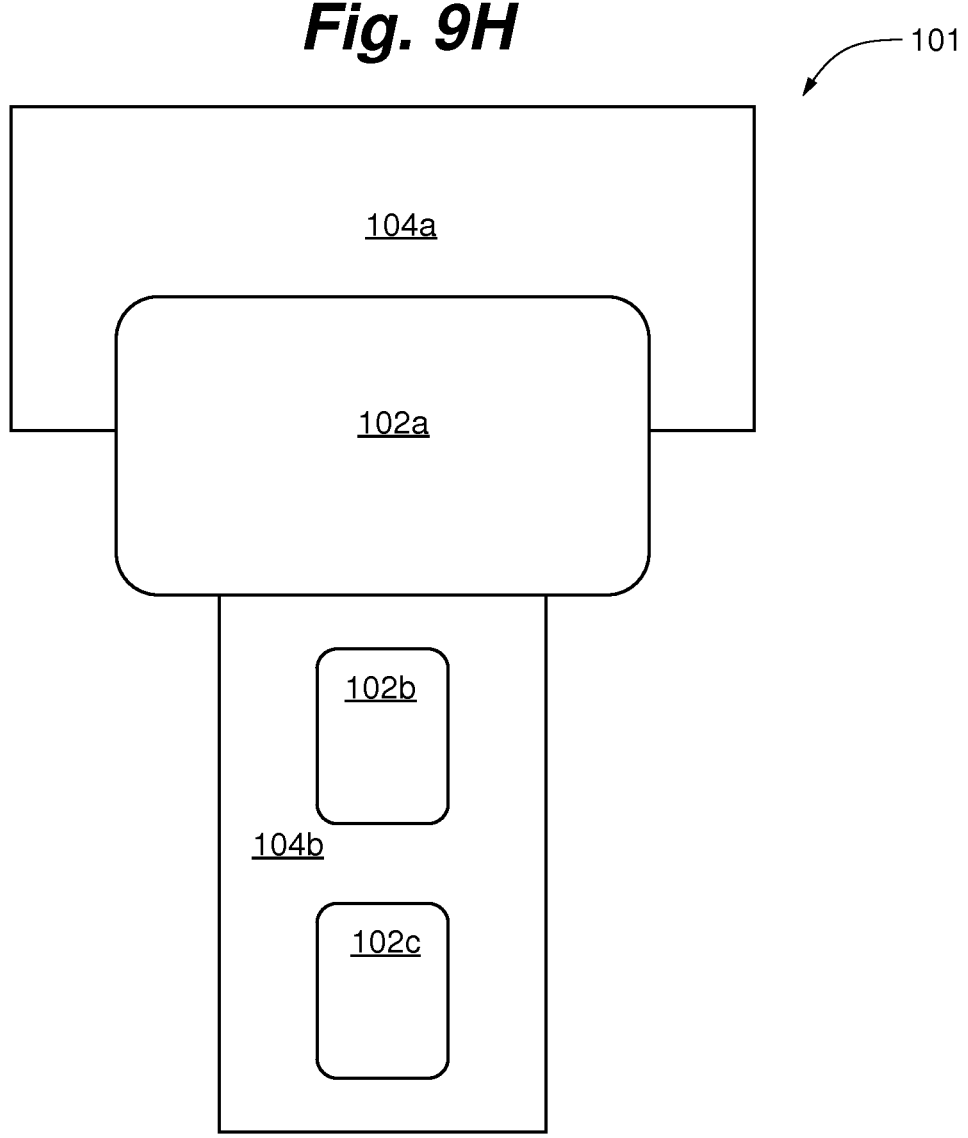
Figure 9I:
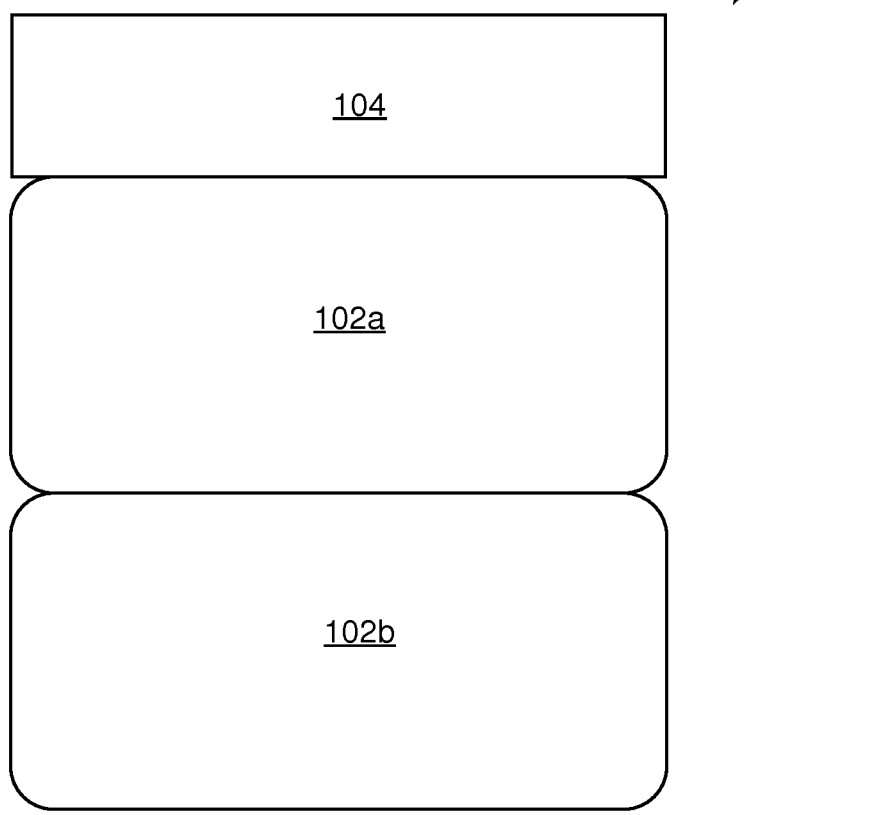
Figure 9J:
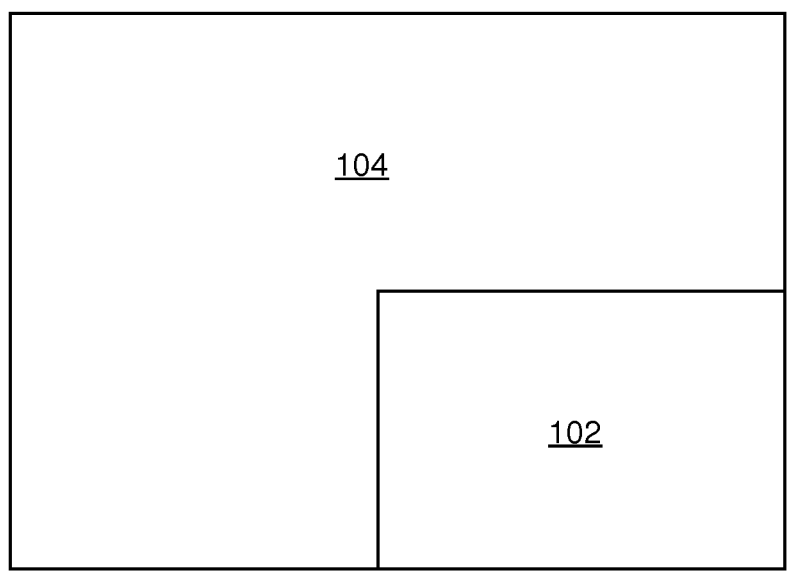

In yet another alternative embodiment, and depicted in FIG. 9J, a single snap-off portion 104 can extend along multiple edges of the transaction card 102, such as an L- or U-shaped snap-off portion, with or without apertures. In these alternative embodiments, one of ordinary skill in the art would recognize that any of a variety of configurations is contemplated.

In other embodiments, and referring to FIGS. 9G and 9H, card 102 is either partially or entirely contained within or embedded within the snap-off portion 104. In one non-limiting example, card 102 is entirely bordered by the snap-off portion 104, as depicted in FIG. 9H.

Referring to FIGS. 9H and 9I, in embodiments, card assembly 101 can comprise multiple cards 102, such as multiple transaction cards 102 removably coupled to another card (e.g. FIG. 9I) and/or one or more snap-off portion(s) 104 (e.g. FIG. 9H). Cards 102 can comprise any combination of conventional credit cards, FOBs, or other transaction items. In one non-limiting example, shown in FIG. 9H, card assembly 100 includes a first snap-off portion 104a and a first transaction card 102a coupled to at least one edge of card 102a. A second snap-off portion 104b is coupled to another edge of card 102a. Additional cards or fobs 102b, 102c, are removably coupled to second snap-off portion 104b.

In another non-limiting example, as depicted in FIG. 9I, a first card 102a is coupled to snap-off portion 104 on at least a first edge of card 102a. One or more additional cards or fobs 102b are removably coupled to an edge of transaction card 102a opposite the edge coupled to snap-off portion 104.

Referring to FIGS. 3, 4, and 10A-10J, panel assembly 114 generally includes a front panel 116 and a rear panel 118, and optional additional panels, secured together by any of a variety of means including, but not limited to heat sealing, ultrasonic welding, adhesive, polymeric tie or functional layers, or combinations thereof. Front panel 116 and rear panel 118 can be discrete panels, or can be a single substrate folded to define front panel 116 and rear panel 118, as well as optional additional panels not shown. In embodiments not shown, optional additional panels can be foldably connected to one or more of front and rear panels 116, 118, and/or can be adhered to one or more of front and rear panels 116, 118, such as, for example, for forming a pocket on one of panels 116, 118. Any of a variety of additional panel configurations can be contemplated without limitation.

Front and rear panels 116, 118 are made of lightweight cardboard or paper, however other materials, such as plastic or synthetic paper, are also contemplated. In one embodiment, front and rear panels 116, 118 can be constructed of 12 point paper optionally coated or treated on one or both sides. In other embodiments, front and rear panels 116, 118 can be constructed of paper optionally coated or treated on one or both sides having a thickness that is thinner or thicker than 12 point. In an alternative embodiment one or both of front and rear panels 116, 118 include a lens array either coupled to or integrally formed thereon, as described, for example, in U.S. Patent Application Publication No. 2011/0132783, entitled "Durable Packaging Assembly for Articles," incorporated herein by reference in its entirety.

Figure 3:
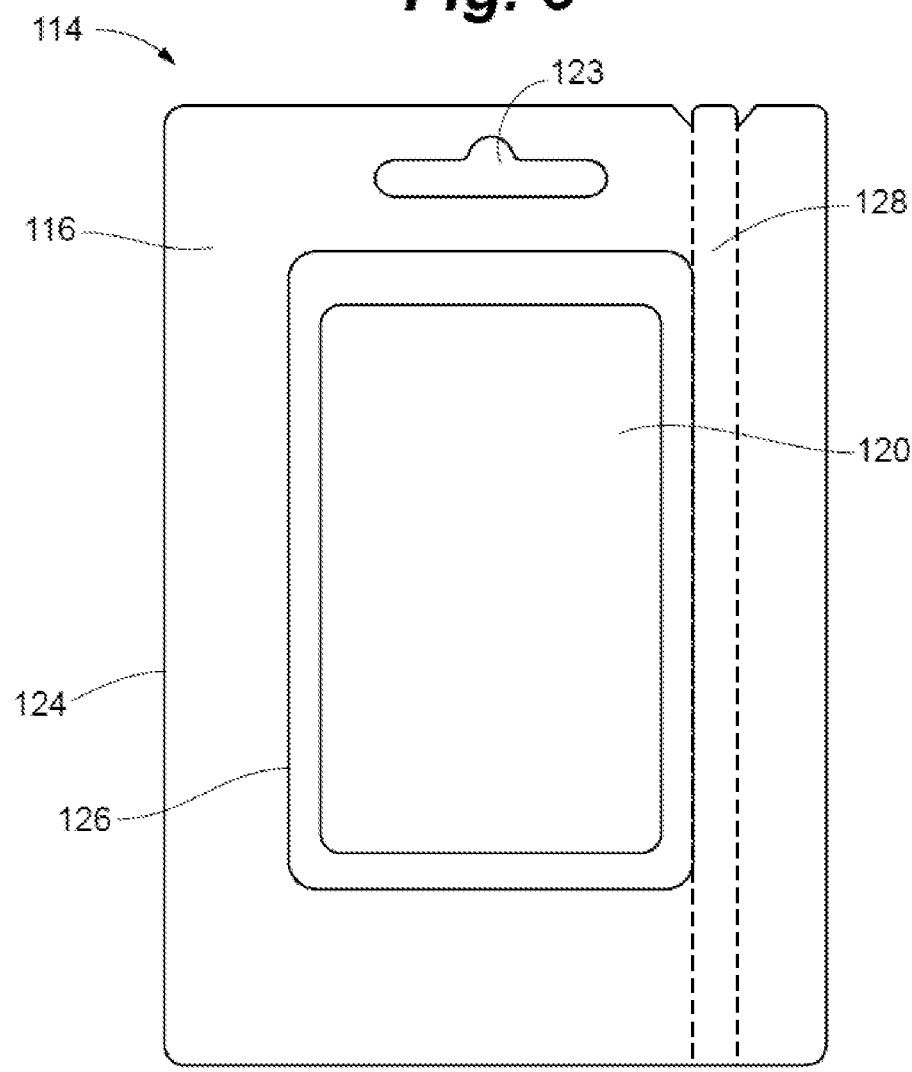
FIG. 3 is a front plan view of a front panel of a tamper evident secure pack carrier assembly in accordance with an embodiment of the disclosure.

Referring to FIG. 3, a front panel 116 of panel assembly 114 is shown. In one embodiment, front panel 116 can include a window 120, sized to allow viewing at least a portion of transaction card 102 when carrier assembly 100 is assembled. Window 120 can be of any size or shape. In one embodiment window 120 is sized to have an opening smaller than the face of transaction card 10. A smaller opening ensures that edge 108 of transaction card 102 will be contained between front panel 116 and rear panel 118 when carrier assembly 100 is assembled.

In one embodiment, one or more bonding areas 122, or areas in which front panel 116 is bonded or adhered to rear panel 118, can be defined between the outer perimeter 124 of front panel 116 and an inner perimeter 126 that can optionally circumscribe a portion of transaction card 102 when carrier assembly 100 is assembled. Bonding area 122 comprises a surface area of front panel 116 that is bonded or adhered to rear panel 118 and/or snap-off portion 104 by heat sealing, adhesive, ultrasonic welding, and/or any of a variety of bonding techniques. Bonding area 122, however, is not necessarily confined to the area between the outer perimeter 124 of front panel 116 and an inner perimeter 126; in other embodiments bonding area 122 can be larger, smaller, or have a different overall shape than the area defined in the embodiment depicted in FIG. 3, as depicted, for example, in a variety of embodiments FIGS. 10A-10J.

Figure 4:
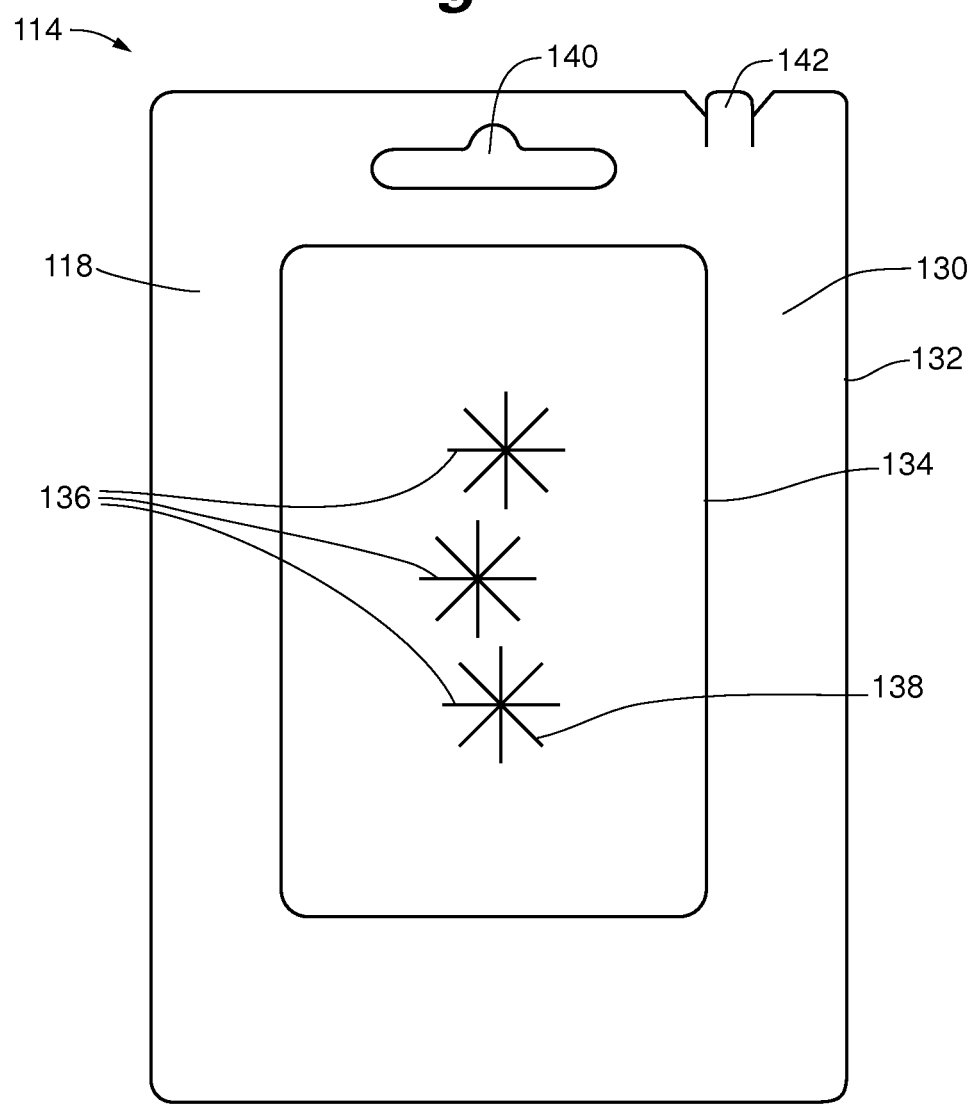
FIG. 4 is a front plan view of a rear panel including starburst perforations in accordance with an embodiment of the disclosure.
Figure 5:
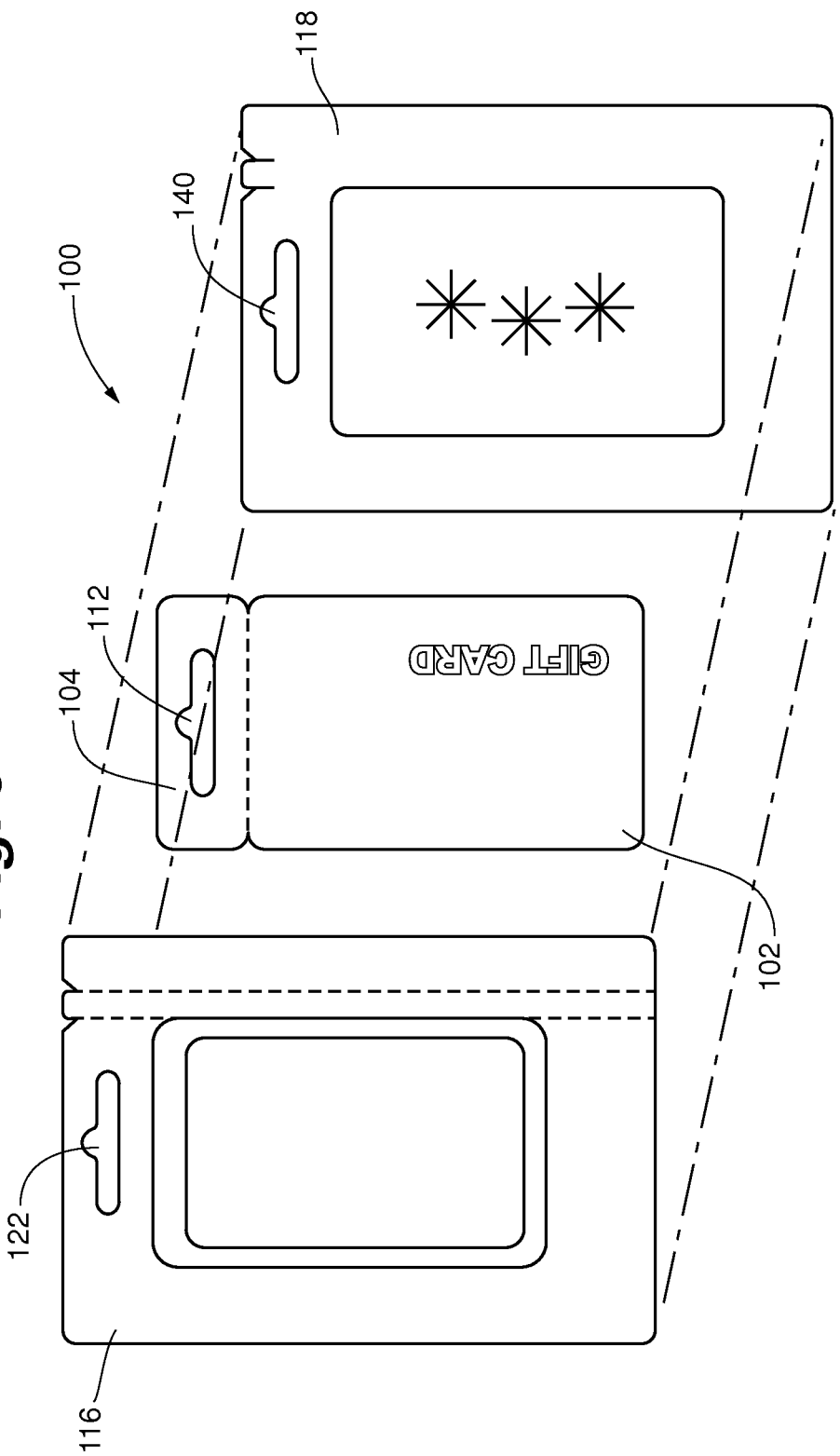
FIG. 5 is a front plan view of the components of a carrier assembly in accordance with an embodiment of the disclosure.

Referring to FIG. 4, rear panel 118 is shown. In one embodiment, rear panel 118 can comprise one or more bonding areas 130 defined between the outer perimeter 132 of rear panel 118 and an inner perimeter 134 that can optionally circumscribe a portion of transaction card 102 when carrier assembly 118 is assembled. Bonding area 130 comprises a surface area of rear panel 118 that is bonded or adhered to front panel 116 or snap-off portion 104. Bonding area 130, however, is not necessarily confined to the area between the outer perimeter 132 and an inner perimeter 134; in other embodiments bonding area 130 can be larger, smaller, or have a different overall shape than the area defined in the embodiment depicted in FIG. 4, as depicted, for example, in a variety of embodiments FIGS. 10A-10J.

Referring back to FIG. 9G, and referring to one non-limiting embodiment, card assembly 100 includes bonding areas extending around and outside of the perimeter of card assembly 101 such that each side of snap-off portion 104 is sealed or anchored within panel assembly 114.

Figure 11A:
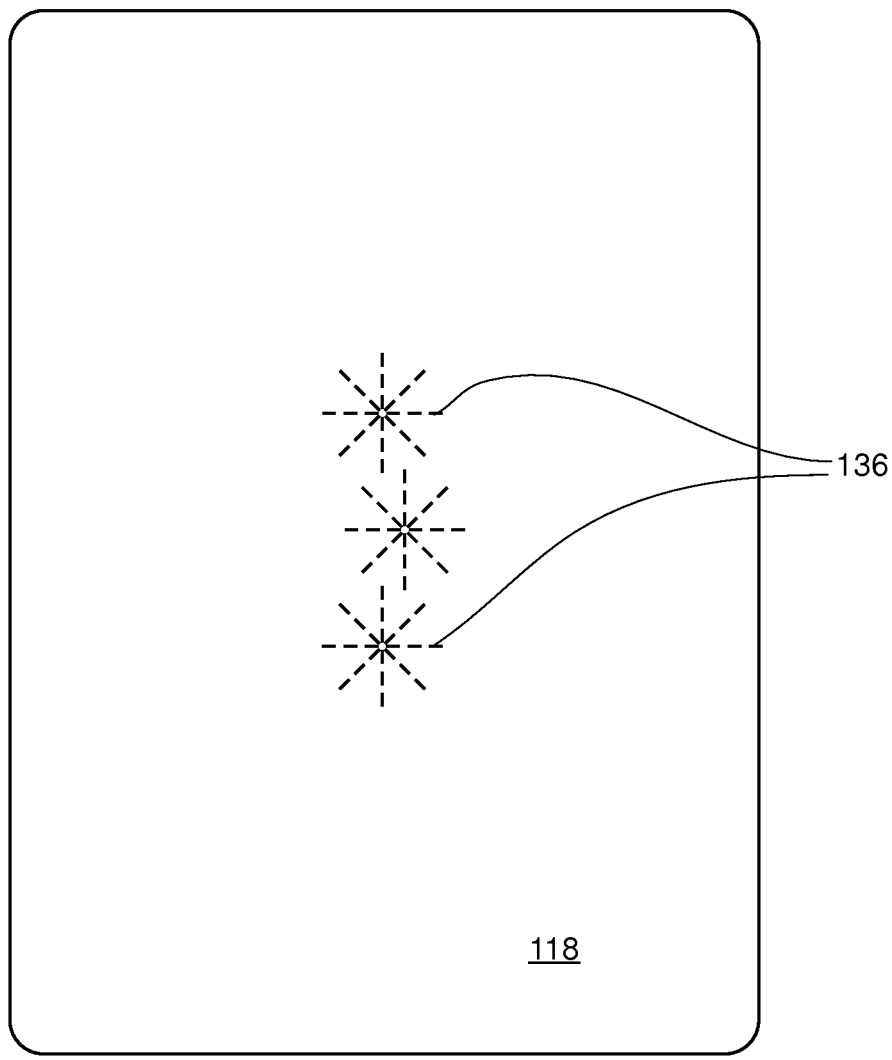
FIGS. 11A-11D are front plan views of panels having starburst perforation patterns in accordance with embodiments of the disclosure.
Figure 11B:
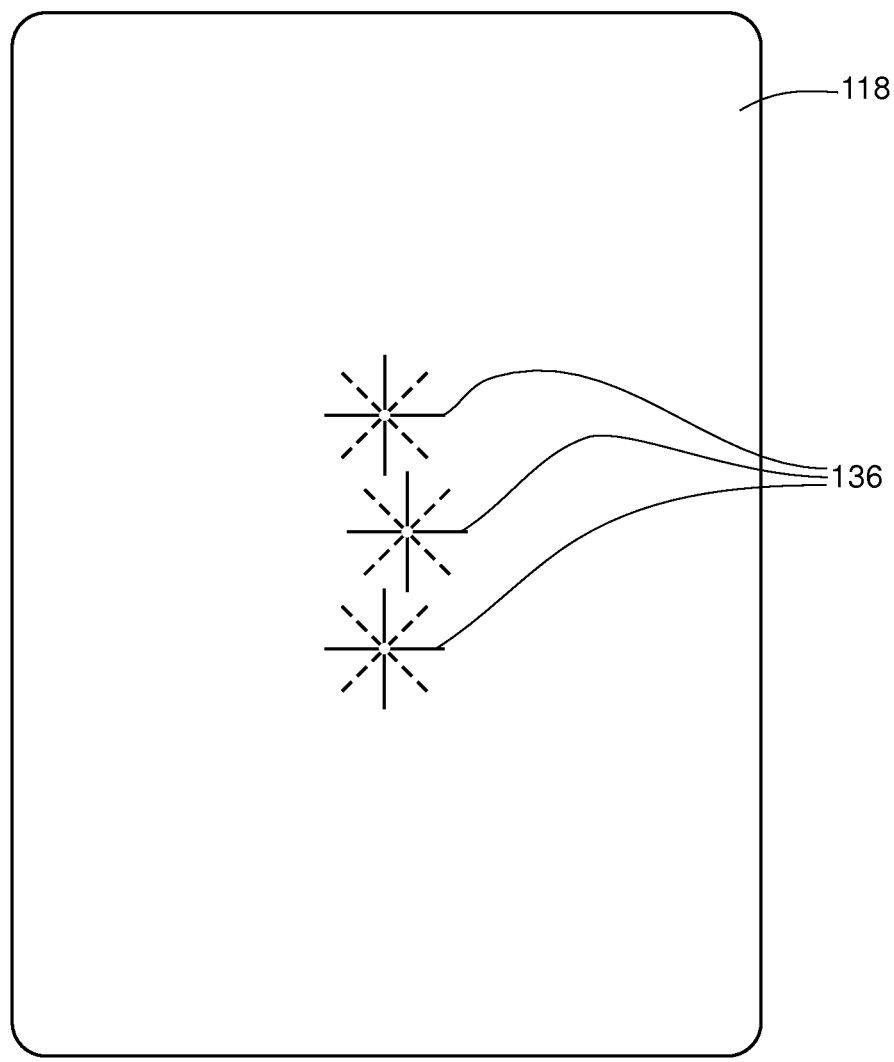
Figure 11C:
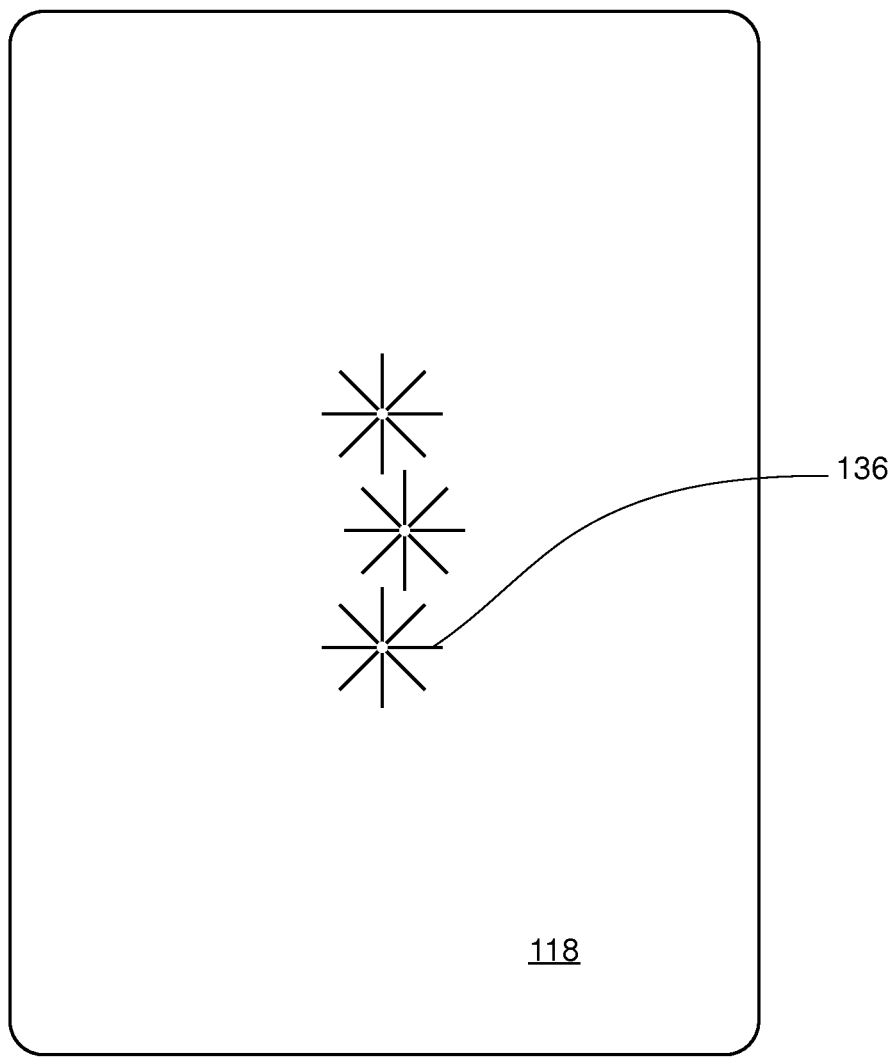
Figure 11D:
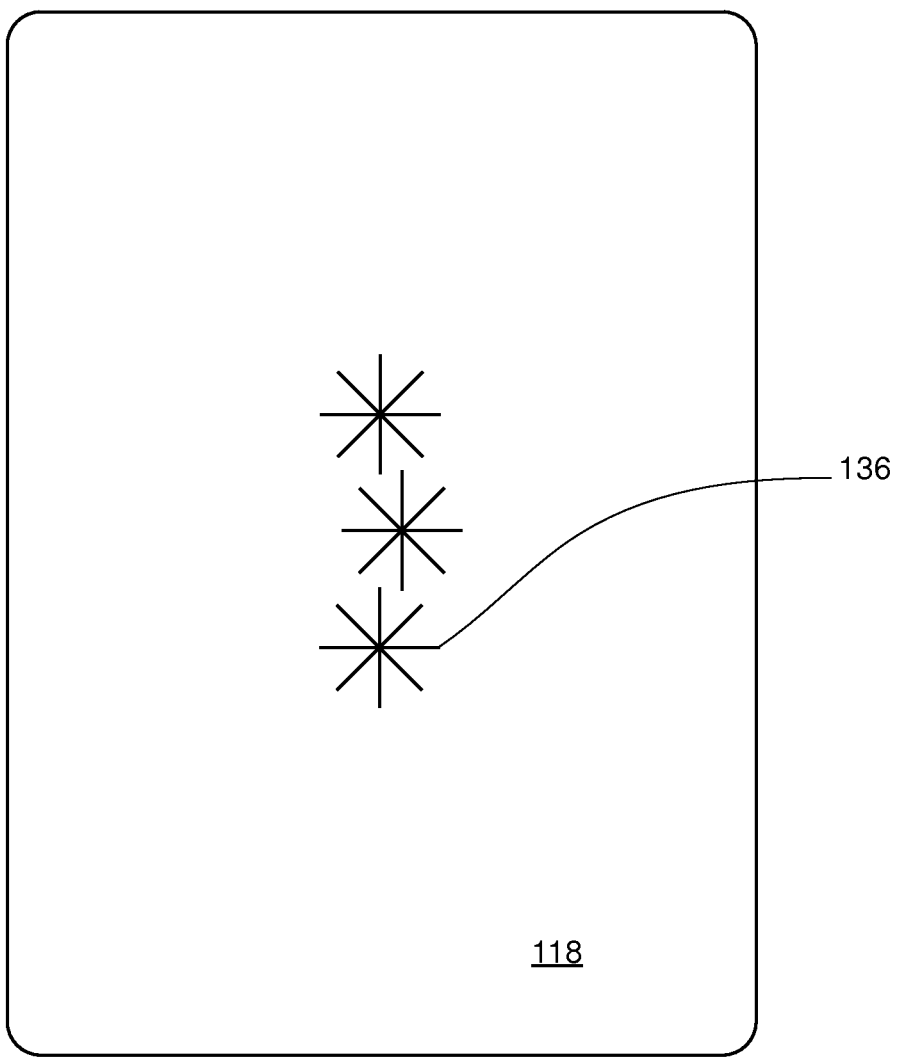

In one embodiment, front panel 116 and/or rear panel 118 (and/or additional panels) can comprise one or more tamper indicating patterns 136. Pattern 136 can comprise a plurality of radial slits forming a "starburst" pattern, a series of parallel and/or perpendicular lines, shapes, indicia such as text or graphics, or combinations thereof. In one non-limiting embodiment depicted in FIG. 4, rear panel 118 can comprise multiple patterns 136, such as a starburst pattern. Each starburst pattern 136 can include a plurality of multi-direction tamper evident radial slits 138 or perforations, formed in rear panel 118 (and/or any other panel of panel assembly 114). Slits 138 can be continuous as shown in FIGS. 11C and 11D, perforated as shown in FIG. 11A, or a combination of both as shown in FIG. 11B.

Each pattern 136 is arranged to provide an indication of whether an attempt has been made to separate the transaction card 102 from the rear panel 118 (or any other panel) which card 102 and/or snap-off portion 104 is coupled to when carrier assembly 100 is assembled. For example, as depicted in FIG. 4, when transaction card 102 is affixed to rear panel 118 atop of a starburst pattern 136, attempts to remove card 102 and/or snap-off portion 104 from rear panel 118, or peel card 102 away from rear panel 118, will cause the rear panel 118 to tear or burst irreversibly along the multi-direction tamper evident radial slits 138, providing a positive indication of tampering. For example, card 102 is adhered, heat sealed, or otherwise bonded to one or more adjacent sections of pattern(s) 136 separated by slit 138. Upon lifting or peeling card 102 from pattern(s) 136, adjacent sections are forced to tear or burst apart due to the different tensions on each section with respect to one another.

Figure 7B:
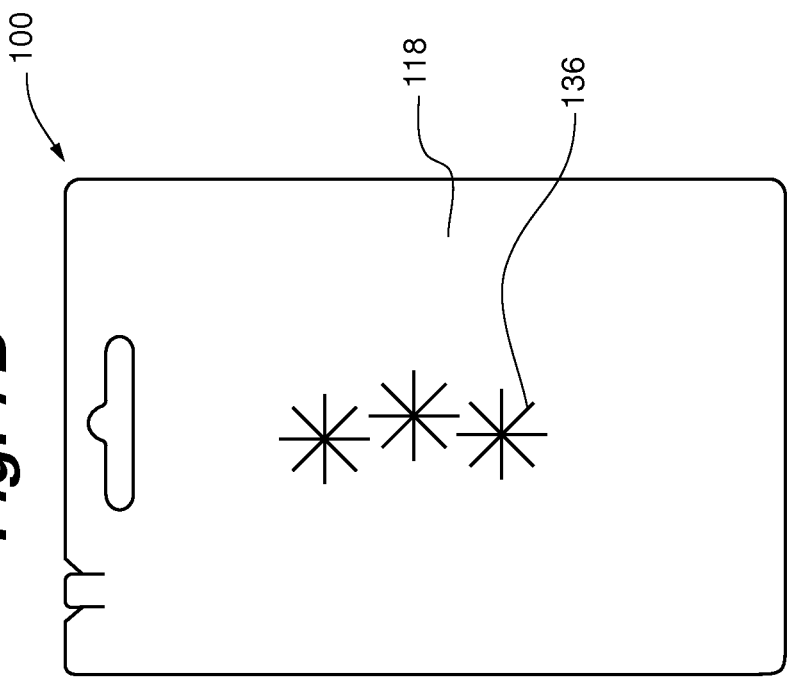
FIG. 7B is a back plan view of the carrier assembly of FIG. 7A.
Figure 7A:
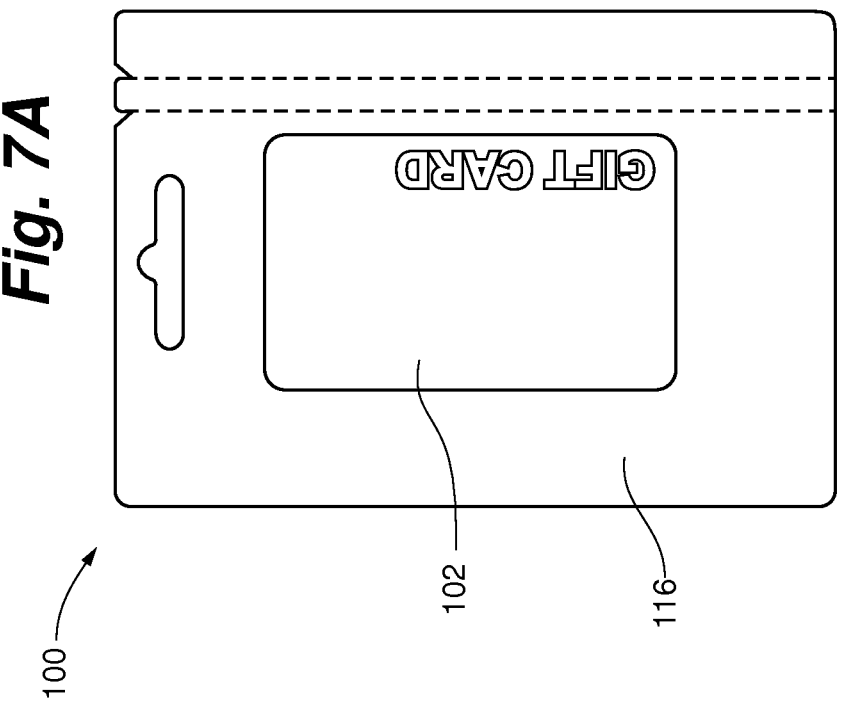
FIG. 7A is a front plan view of a carrier assembly in accordance with an embodiment of the disclosure.

Tamper indicating pattern 136 can be formed by scoring, perforating, die cutting, or any other manner as is well known in the art. In one embodiment, pattern 136 can be die cut into the rear panel 118, from the side of rear panel 118 facing away from transaction card 102 and visible when viewing carrier assembly from the back (as depicted in FIG. 7B). In other embodiments, the pattern 136 can be altered by making them larger or smaller relative to one another, or by adding or removing multi-direction radial slits 138 or perforations. In one embodiment, multi-directional radial slits 138 can be curved in nature, rather than a straight line.

In one embodiment, front panel 116 and/or rear panel 118 can include an aperture 123, 140 that enables carrier assembly 110 to be displayed from a display peg, hook, or similar device. In an embodiment in which snap-off portion 104 includes aperture 112, apertures 123, 140 can be of the same or different shape as aperture 112, and can optionally align with aperture 112. In an alternative embodiment not shown, the panel assembly does not include any hanging apertures.

Rather, a portion of the snap-off portion with a hanging aperture formed therein extends from the perimeter of the panel assembly.

In embodiments, panel assembly 114 can include a tear strip 128, 142 or other opening mechanism such as a tab formed in one or both front and rear panels 116, 118 for accessing transaction card 102 after purchase.

In embodiments, one or more panels of panel assembly 114 can include human and/or machine-readable indicia 150 (as shown in FIGS. 10A-10J) such as magnetic stripes, barcodes, QR codes, alphanumeric codes, graphics, text, smart chips (integrated circuits), or any of a variety of features or combinations thereof. In one embodiment, indicia 150 comprises activation indicia that when read at purchase, such as by swiping a magnetic stripe, transaction card 102 is activated and ready to use.

Referring to FIGS. 5-7B, carrier assembly 100 is shown. Carrier assembly 100 includes transaction card 102 and snap-off portion 104, enclosed between front panel 116 and rear panel 118. In one non-limiting embodiment, snap-off portion 104, front panel 116 and rear panel 118 can be arranged so that apertures 112, 123 and 140 align, so that carrier assembly 100 can be displayed from a display peg, hook, or similar device, as described above.

In one embodiment, transaction card 102 can be affixed to rear panel 118 atop of one or more tamper indicating patterns 136. Transaction card 102 can be affixed to rear panel 118 by an adhesive 144, friction fit, slits, or any of a variety of attachment mechanisms. For example adhesive 144 can be a hot melt adhesive or glue, fugitive glue, a cold-applied adhesive, or double-sided adhesive tape. In one embodiment, adhesive 144 is placed on one or more starburst tamper indicating patterns 136 of rear panel 118, and transaction card 102 is positioned on the adhesive 144, such that when the carrier assembly 100 has been sealed closed, then reopened, the removal of transaction card 102 will destroy the rear panel 118, thereby showing that the carrier assembly 100 has been tampered with.

In one embodiment, the bonding areas 122 and 130 of front and rear panels 116, 118 can be affixed to each other to define one or more seam or bind areas 146. In one embodiment, front and rear panels 116, 118 are bonded together by a heat seal bonding process. In other embodiments, front and rear panels 116, 118 are bonded together by any type of adhesive (multi-part adhesives such as epoxies, heat activated or heat cured adhesives, moisture activated or moisture cured adhesives, radiation activated or radiation cured adhesives such as UV or ebeam, pressure sensitive adhesives, or combinations thereof), glue, double sided adhesive tape, ultrasonic welding, mechanical bonding such as complimentary raised/relief or embossed/de-bossed aligning structures or tabs, or any other manner as is well known in the art.

In embodiments, snap-off portion 104 can be at least partially embedded in seam 146 between front and rear panels 116, 118, thereby fixing or anchoring snap-off portion 104 in position relative to front and rear panels 116, 118. In one non-limiting embodiment, the seam can circumscribe at least a portion of the perimeter of the transaction card 102, thereby encircling the face of transaction card 102 without contacting the edge 108 of transaction card 102.

In one particular, yet non-limiting embodiment, when carrier assembly 100 is viewed from the front, front panel 116 and at least a portion of transaction card 102 can be seen. When carrier assembly 100 is viewed from the back, rear panel 118 and one or more tamper indication patterns 136 can be seen.

Figure 10A:
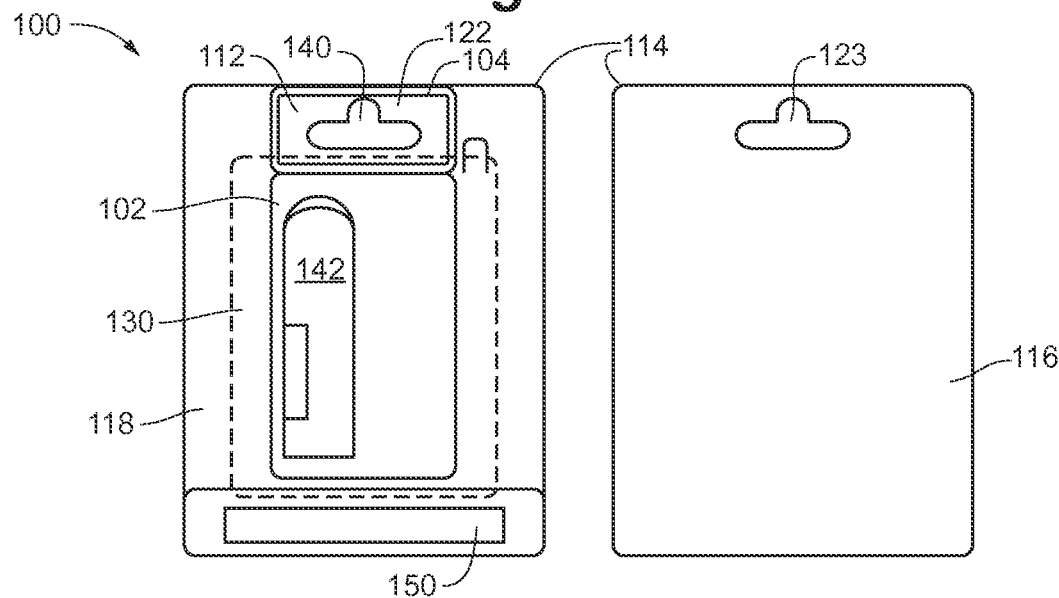
FIGS. 10A-10J are front plan views of carrier assemblies in accordance with embodiments of the disclosure.

Referring to FIGS. 10A-10J, various embodiments of carrier assembly 100 are depicted. For sake of simplicity, front and rear panels 116, 118 are referenced in a particular order; however, they can be interchanged. In FIG. 10A, snap-off portion 104 includes an aperture 123 that aligns with hanging aperture 140 of rear panel 118. Front panel 116 is then coupled, such as by adhesive or heat sealing, to rear panel 118, such that bonding areas 122, 130 including areas around card 102, and within aperture 123 of snap-off portion 104, thereby anchoring card assembly 101 between panel assembly 114. Optionally, rear panel 118 includes a magnetic stripe 150 or other activation indicia, and tear strip 142.

Figure 10B:
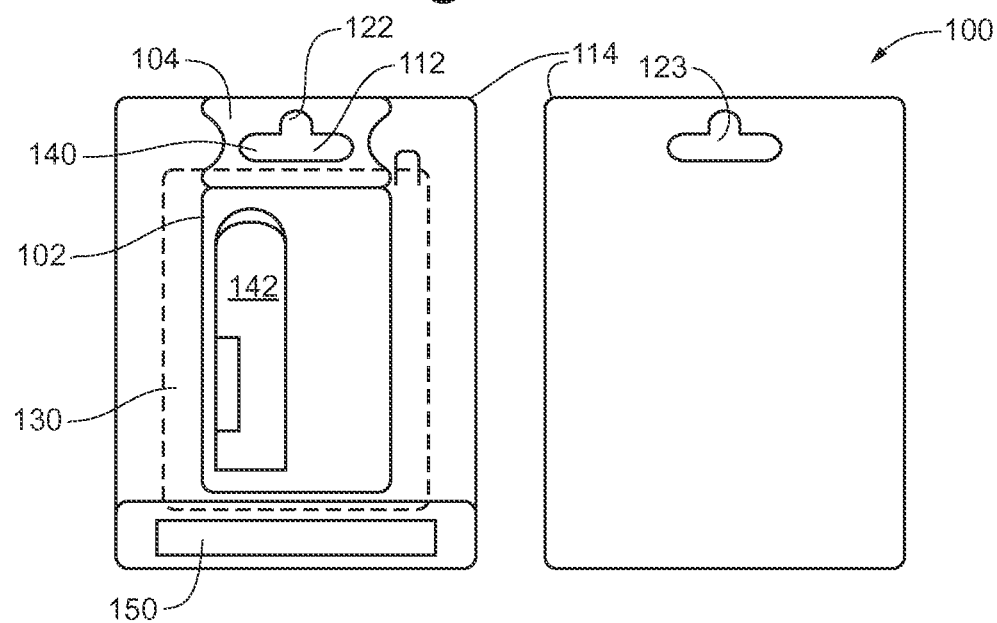

FIG. 10B depicts a similar configuration, except with a differently shaped snap-off portion 104 and aperture 123. In this embodiment, panels 116, 118 are secured together such that bonding areas 122, 130 extend over at least a portion of snap-off portion 104, thereby anchoring card assembly 101 between panel assembly 114.

Figure 10C:
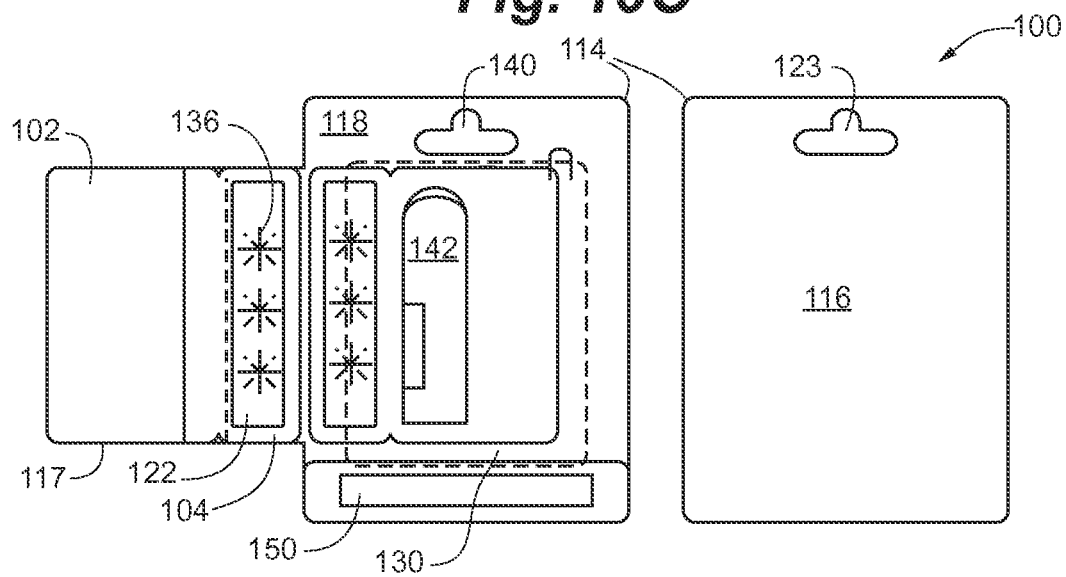

FIG. 10C depicts a panel assembly 114 including front panel 116, rear panel 118, and an intermediate panel 117. Card assembly 101 is coupled to intermediate panel 117, which includes one or more tamper indicating patterns 136 defined thereon. Intermediate panel 117 and card assembly 101 are folded onto rear panel 118, and front panel 116 is secured thereto such that bonding areas 122, 130 extend over at least a portion of snap-off portion 104, thereby anchoring card assembly 101 between panel assembly 114. In this embodiment, snap-off portion 104 is substantially parallel to a long or longitudinal edge of card 102, and a longitudinal edge of rear panel 118. Panels 116 and 118 can be individual panels, or can be separated by a fold line.

Figure 10D:
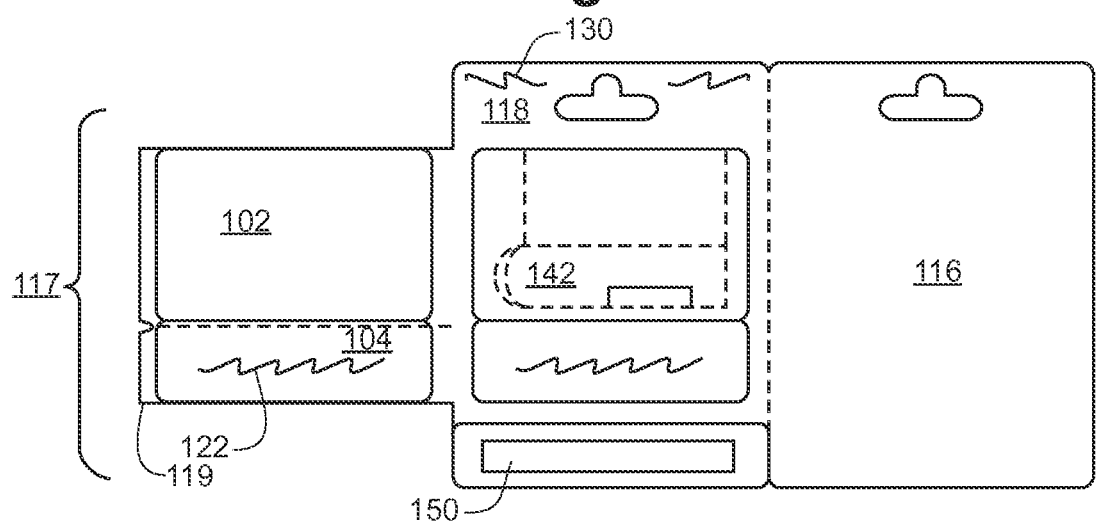

FIG. 10D is similar in configuration to FIG. 10C, except that intermediate panel 117 includes a detachable portion 119 aligned with snap-off portion 104 of card assembly 101. Intermediate panel 117 and card assembly 101 are folded onto rear panel 118, and front panel 116 is secured thereto such that bonding areas 122, 130 extend over at least a portion of snap-off portion 104, thereby anchoring card assembly 101 between panel assembly 114. In this embodiment, snap-off portion 104 is substantially parallel to a long or longitudinal edge of card 102, and a lateral edge of rear panel 118. Panels 116 and 118 can be individual panels, or can be separated by a fold line.

Figure 10E:
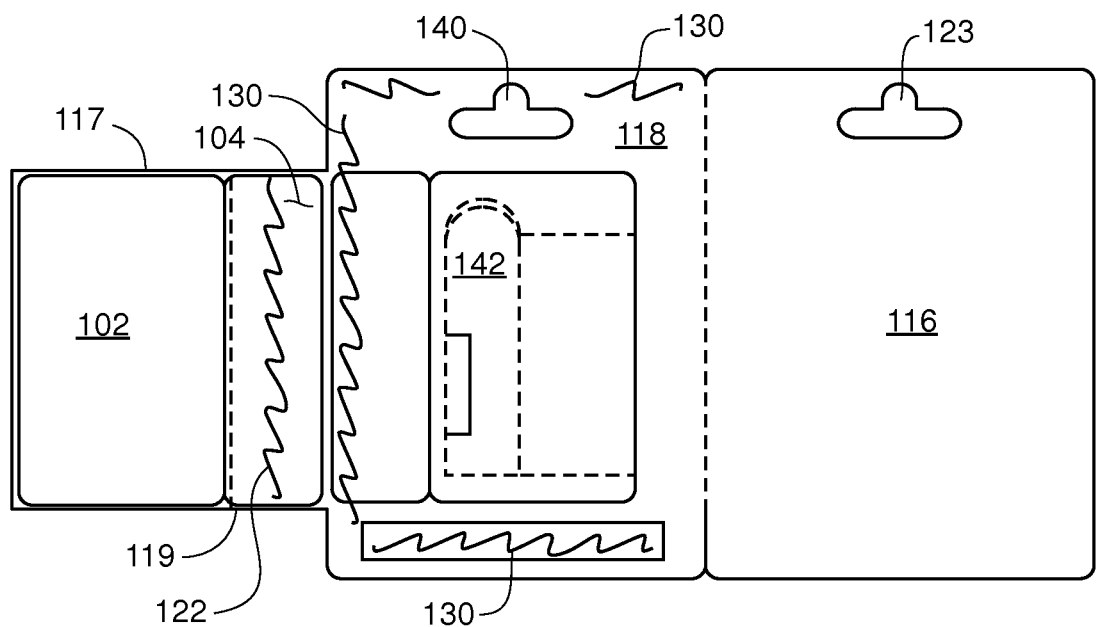

FIG. 10E is similar in configuration to FIG. 10D, except that intermediate panel 117 is coupled to rear panel 118 along a longitudinal edge of detachable portion 119, which is aligned with snap-off portion 104 of card assembly 101. Intermediate panel 117 and card assembly 101 are folded onto rear panel 118, and front panel 116 is secured thereto such that bonding areas 122, 130 extend over at least a portion of snap-off portion 104, thereby anchoring card assembly 101 between panel assembly 114. In this embodiment, snap-off portion 104 is substantially parallel to a long or longitudinal edge of card 102, and a longitudinal edge of rear panel 118. Panels 116 and 118 can be individual panels, or can be separated by a fold line.

Figure 10F:
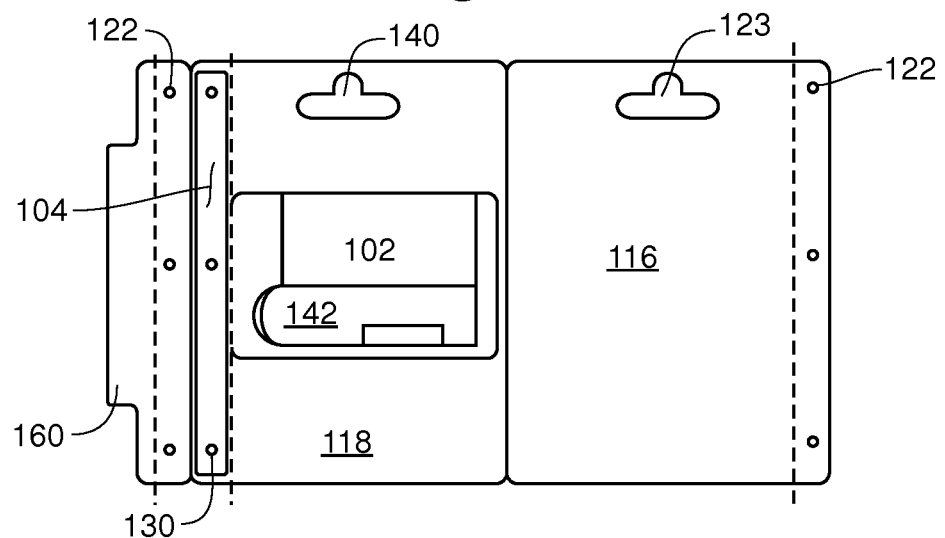

FIG. 10F depicts a panel assembly 114 including a front panel 116 foldable with respect to rear panel 118, and a longitudinal tab 160 extending from a longitudinal edge of rear panel 118, opposite the edge to which front panel 116 is attached. Snap-off portion 104 extends at least along the longitudinal edge adjacent the longitudinal tab 160. Front panel 116 is secured to rear panel 118 such that such that bonding areas 122, 130 extend over at least a portion of snap-off portion 104, thereby anchoring card assembly 101 between panel assembly 114. Longitudinal tab 160 is then folded over an exterior surface of front panel 116 and secured thereto.

Figure 10G:
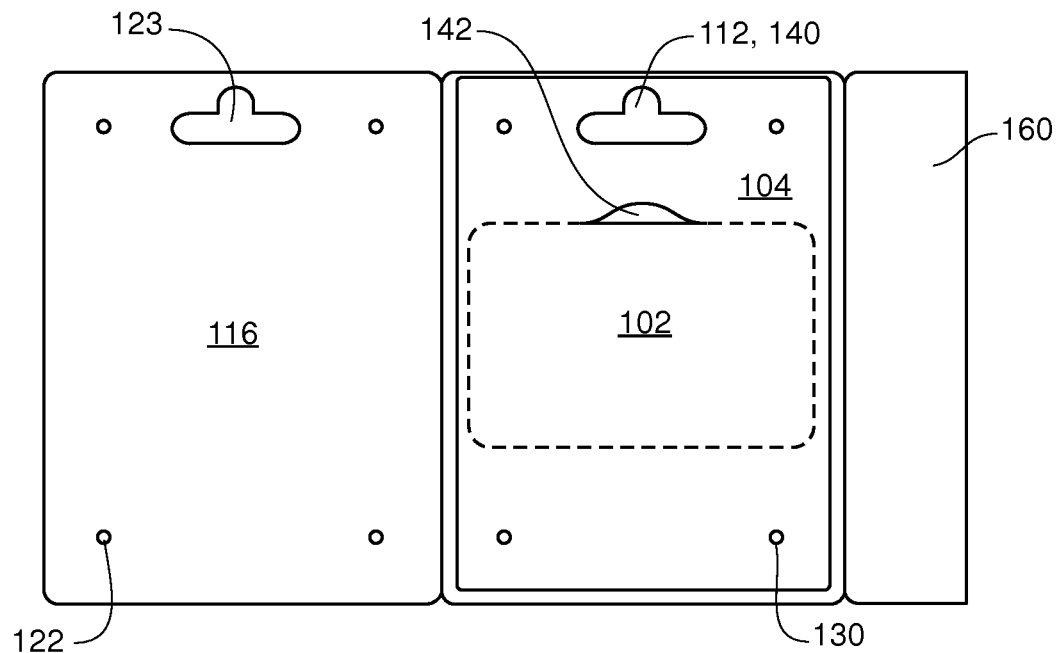

FIG. 10G depicts a card assembly 101 in which card 102 is completely contained within the perimeter of snap-off portion 104. Snap-off portion 104 is substantially the same size as rear panel 118. Front panel 116 is folded over and secured to snap-off portion 104 and optionally exposed areas of rear panel 118. Optionally, a longitudinal tab portion 160 is foldably coupled to an edge of rear panel 118 opposite front panel 116. Longitudinal tab portion 160 is folded over an exterior surface of front panel 116 and secured thereto.

Figure 10H:
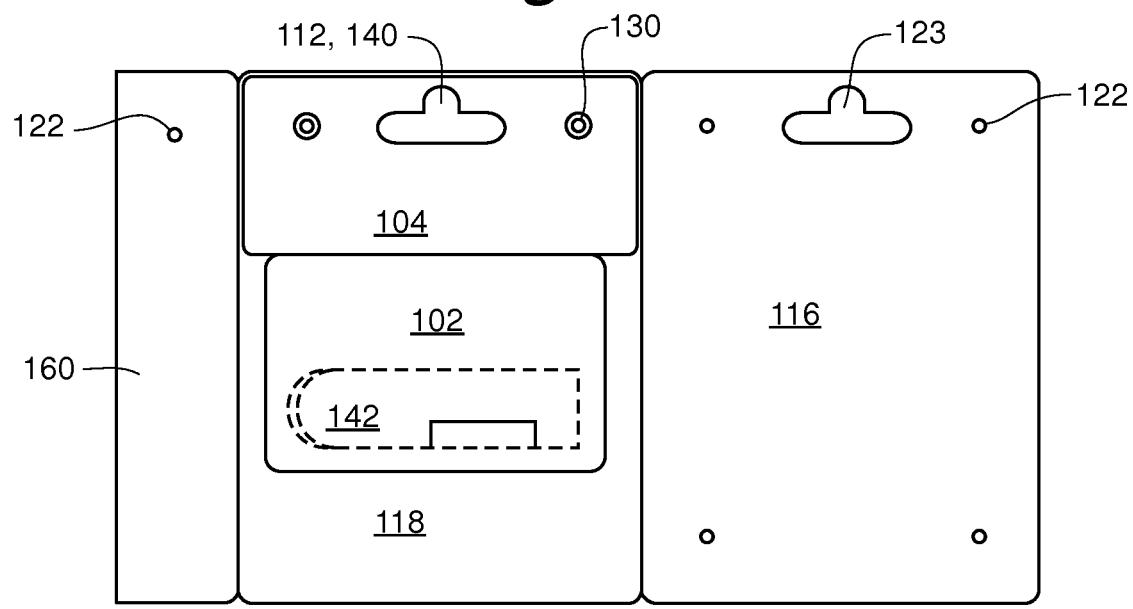

FIG. 10H depicts a similar configuration to FIG. 10G, except that snap-off portion 104 is coupled to card 102 along a single edge. Front panel 116 is folded over and secured to snap-off portion 104 and optionally exposed areas of rear panel 118. Optionally, a longitudinal tab portion 160 is foldably coupled to an edge of rear panel 118 opposite front panel 116. Longitudinal tab portion 160 is folded over an exterior surface of front panel 116 and secured thereto.

Figure 10I:
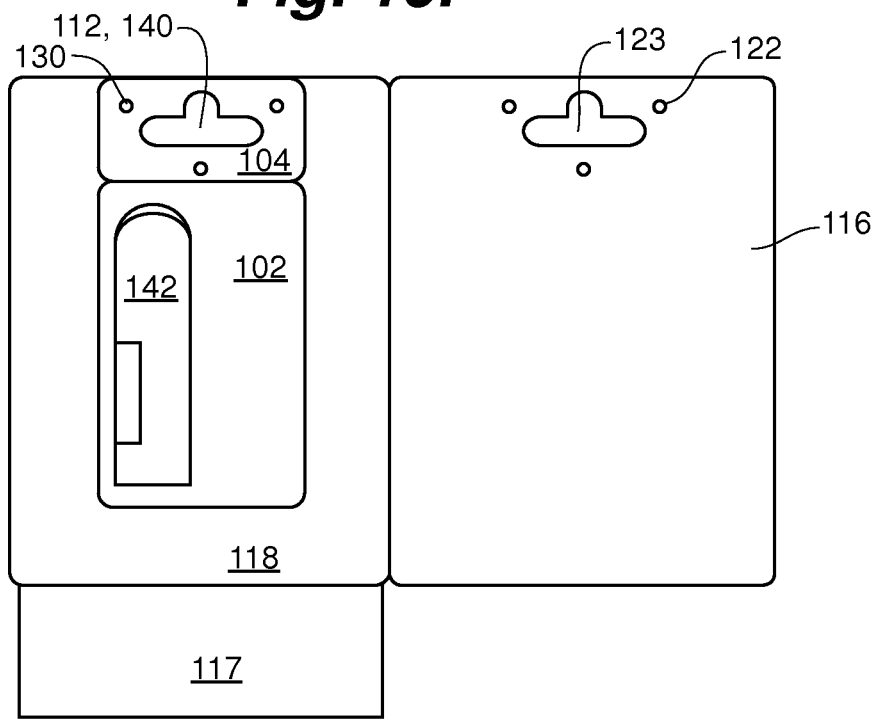

FIG. 10I depicts a carrier assembly 100, including a panel assembly 114 having a front panel 116 coupled to rear panel 118 along a first common longitudinal edge. Intermediate panel 117 is coupled to a first lateral edge of rear panel 118 adjacent the first common longitudinal edge. Card assembly 101 is secured to a top portion of rear panel 118 such that apertures 123, 140 align. Front panel 116 is folded over an coupled to rear panel 118 such that bonding area 122 extends over at least a portion of snap-off portion 104, thereby anchoring card assembly 101 between panel assembly 114. Intermediate panel 117 is folded over and bonded either between front and rear panels 116, 118, or on an exterior surface of front panel 116.

Figure 10J:
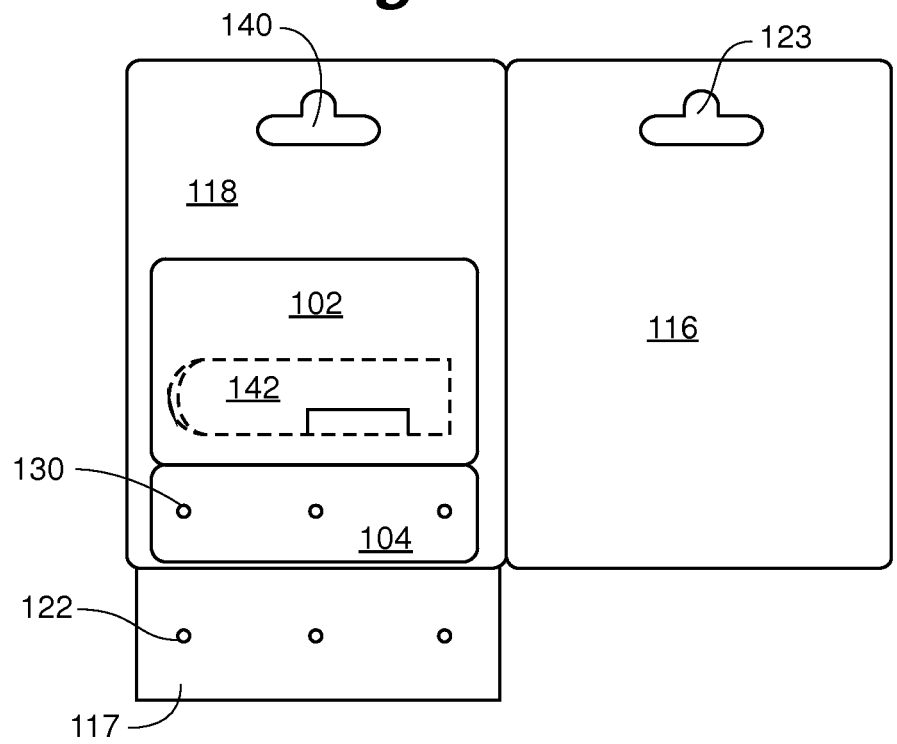

FIG. 10J depicts a similar configuration to FIG. 10I except that snap-off portion 104 does not include an aperture, and is secured to a bottom portion of rear panel 118. An intermediate panel 117 extends from a bottom edge of rear panel 118. Intermediate panel 117 is folded over and secured to snap-off portion 104. Front panel 116 is then folded over and secured to rear panel 118 and/or intermediate panel 117 to anchor card assembly 102 within panel assembly 114.

As discussed above, front and/or rear panels 116, 118 can include human and/or machine-readable indicia 150 such as magnetic stripes, barcodes, QR codes, alphanumeric codes, graphics, text, smart chips (integrated circuits), or any of a variety of features or combinations thereof. In one embodiment, indicia 150 comprises activation indicia that when read at purchase, such as by swiping a magnetic stripe, transaction card 102 is activated and ready to use.

Also, as discussed above, front and/or rear panels 116, 118 can include an opening mechanism, such as a tab or tear strip 120, 142 for access to card 102 after purchase.

Figure 8:
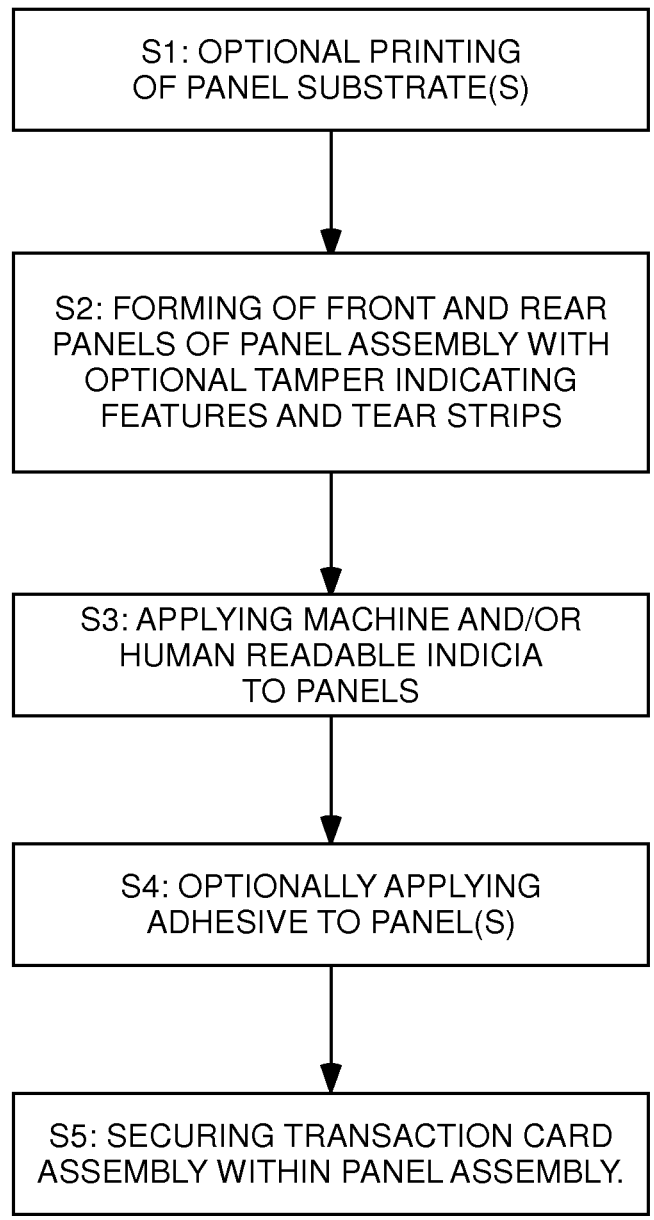
FIG. 8 is a method for manufacturing a carrier assembly in accordance with an embodiment of the disclosure.

Referring to FIG. 8, in one non-limiting embodiment, carrier assembly 100 can be manufactured by a plurality of steps. At S1, sheets of suitable material are optionally printed for the front and rear panels 116, 118. Optionally, printing sheets can have a bonding agent such as an adhesive or heat sealable material applied to the side of the panel comprising the respective bonding area 122, 130. At S2, printing sheets can be cut into individual front and rear panels 116, 118, or alternatively, fold lines are formed. In this step, one or more tamper indicating patterns 136 and/or panel apertures can be cut into front, rear, and/or intermediate panel(s) if present, and as desired. A tear strip 128 or 140 or other opening mechanism can be formed in either or both panels.

At S3, either before or after S2, additional information or machine and/or human readable indicia, barcodes, QR codes, alphanumeric codes, graphics, text, smart chips (integrated circuits), or any of a variety of features or combinations thereof, can be printed or applied on/in front and/or rear panels 116, 118 as desired.

At S4, an adhesive or bonding layer 144 can be applied to the one or more tamper indicating patters 136 (if present) and transaction card 102 can be placed atop of the adhesive 144, thereby attaching the transaction card 102 to a panel 116 or 118. Optionally, additional adhesive can be applied to the face of transaction card 102 and an additional portion of panel assembly 100 can be affixed to transaction card 102. For example, a folded paper leaflet containing terms and conditions for use of the card can be attached to transaction card 102 and/or any panel.

At S5, transaction card 102 and snap-off portion 104 are positioned between front panel 116 and rear panel 118, and the panels are sealed to one another, such as by heat sealing, adhesive, or other sealing mechanism such that bonding areas 122 and 130 come together to create seam 146. After S5, carrier assembly 100 is complete.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

What is claimed is:

1. A transaction card and carrier system, comprising:
a transaction card assembly comprising a transaction card, and a detachable portion selectively detachable from the transaction card, wherein the transaction card includes a magnetic stripe proximate an edge of the transaction card, wherein the detachable portion of the transaction card assembly is coupled to the edge that is proximate the magnetic stripe, and wherein the magnetic stripe is only swipeable or usable upon removal of the detachable portion of the transaction card assembly from the transaction card; and
a panel assembly comprising at least two panels sealed to each other, thereby defining a bind area,
wherein the transaction card assembly is positioned between the at least two panels, and the detachable portion of the transaction card assembly is secured within the bind area to anchor the transaction card assembly to the panel assembly, and
wherein both the detachable portion of the transaction card assembly and the panel assembly comprise structure defining a hanging aperture, and wherein the transaction card assembly is positioned between the at least two panels such that the hanging aperture of the detachable portion of the transaction card assembly and the panel assembly are aligned.

2. The transaction card and carrier system of claim 1, wherein the panel assembly comprises a substrate folded over on and bonded to itself to form the at least two panels.

3. The transaction card and carrier system of claim 1, wherein the at least two panels comprises discrete panels bonded to one another.

4. The transaction card and carrier system of claim 1, wherein the at least two panels are heat sealed to one another.

5. The transaction card and carrier system of claim 1, wherein the at least two panels are adhesively bonded to one another.

6. The transaction card and carrier system of claim 1, wherein the detachable portion of the transaction card assembly comprises a snap-off portion coupled to the edge of the transaction card.

7. The transaction card and carrier system of claim 1, wherein at least one panel of the panel assembly further comprises structure defining one or more tamper indicating patterns, and wherein the transaction card assembly is adhered to the one or more tamper indicating patterns such that removal of the transaction card assembly from the panel assembly causes rupturing of the one or more tamper indicating patterns.

8. The transaction card and carrier system of claim 7, wherein each of the one or more tamper indicating patterns comprises a series of radial-extending slits formed in the at least one panel.

9. A transaction card and carrier system comprising:
a transaction card assembly comprising a transaction card; and
a panel assembly comprising at least two panels sealed to each other,
wherein a panel of the panel assembly further comprises structure defining at least three tamper indicating patterns, wherein each of the three tamper indicating patterns comprises a series of multidirectional extending slits, and wherein the transaction card is adhered to the at least three tamper indicating patterns such that removal of the transaction card therefrom causes rupturing of the at least three tamper indicating patterns.

10. The transaction card and carrier system of claim 9, wherein each of the one or more tamper indicating patterns comprises a series of radially extending slits.

11. The transaction card and carrier system of claim 9, wherein two of at least the three tamper indicating patterns are centered on the panel with respect to a short edge of the panel, and the third tamper indicating pattern is offset from the other two tamper indicating patterns.

12. The transaction card and carrier system of claim 9, wherein the at least two panels are secured to each other to define a bind area, and wherein the transaction card assembly is positioned between the at least two panels, and secured within the bind area to anchor the transaction card assembly to the panel assembly.

13. The transaction card and carrier system of claim 9, wherein the transaction card assembly further includes a detachable portion removably coupled to the transaction card along at least a first edge of the transaction card.

14. The transaction card and carrier system of claim 13, wherein the at least two panels are secured to each other to define a bind area, wherein the transaction card assembly is positioned between the at least two panels, and wherein the detachable portion of the transaction card assembly is secured within the bind area to anchor the transaction card assembly to the panel assembly.

15. The transaction card and carrier system of claim 13, wherein the transaction card includes a magnetic stripe proximate an edge of the transaction card, wherein the detachable portion of the transaction card assembly is coupled to the edge that is proximate the magnetic stripe, and wherein the magnetic stripe is only swipeable or usable upon removal of the detachable portion of the transaction card assembly from the transaction card.

16. The transaction card and carrier system of claim 13, wherein the both the detachable portion of the transaction card assembly and the panel assembly comprise structure defining a hanging aperture, and wherein the transaction card assembly is positioned between the at least two panels such that the hanging aperture of the detachable portion of the transaction card assembly and the panel assembly are aligned.

17. The transaction card and carrier system of claim 16, wherein the hanging aperture of the detachable portion of the transaction card assembly is larger than the hanging aperture of the panel assembly, and wherein the at least two panels are secured together within a perimeter of the hanging aperture of the detachable portion of the transaction card assembly, thereby anchoring the transaction card assembly in the panel assembly.

18. A transaction card carrier assembly for securely enclosing one or more transaction cards within, the transaction card carrier assembly comprising:
at least two panels sealable to each other, wherein one of the panels includes structure defining three tamper indicating patterns, wherein each of the three tamper indicating patterns comprises a series of multidirectional extending slits, wherein a transaction card is configured to be adhered to the three tamper indicating patterns such that removal of the transaction card from the at least one panel causes rupturing of at least one of the three tamper indicating patterns.

19. The transaction card carrier assembly of claim 18, wherein at least one of the three tamper indicating patterns comprises a series of radially extending slits.

20. The transaction card carrier assembly of claim 18, wherein two of at least the three tamper indicating patterns are centered on the panel with respect to a short edge of the panel, and the third tamper indicating pattern is offset from the other two tamper indicating patterns.

21. A transaction card and carrier system comprising:
a transaction card assembly comprising a transaction card, and a detachable portion removably coupled to the transaction card along at least a first edge of the transaction card; and
a panel assembly comprising at least two panels sealed to each other,
wherein at least one panel of the panel assembly further comprises structure defining one or more tamper indicating patterns, and wherein the transaction card is adhered to the at the one or more tamper indicating patterns such that removal of the transaction card therefrom causes rupturing of the one or more tamper indicating patterns, and
wherein the transaction card includes a magnetic stripe proximate an edge of the transaction card, wherein the detachable portion of the transaction card assembly is coupled to the edge that is proximate the magnetic stripe, and wherein the magnetic stripe is only swipeable or usable upon removal of the detachable portion of the transaction card assembly from the transaction card.

22. The transaction card and carrier system of claim 21, wherein each of the one or more tamper indicating patterns comprises a series of radially extending slits.

23. The transaction card and carrier system of claim 21, wherein a panel of the panel assembly comprises at least three tamper indicating patterns, wherein each of the three tamper indicating patterns comprises a series of multidirectional extending slits.

24. The transaction card and carrier system of claim 23, wherein two of at least the three tamper indicating patterns are centered on the panel with respect to a short edge of the panel, and the third tamper indicating pattern is offset from the other two tamper indicating patterns.

25. The transaction card and carrier system of claim 21, wherein the at least two panels are secured to each other to define a bind area, and wherein the transaction card assembly is positioned between the at least two panels, and secured within the bind area to anchor the transaction card assembly to the panel assembly.

26. The transaction card and carrier system of claim 21, wherein the at least two panels are secured to each other to define a bind area, wherein the transaction card assembly is positioned between the at least two panels, and wherein the detachable portion of the transaction card assembly is secured within the bind area to anchor the transaction card assembly to the panel assembly.

27. The transaction card and carrier system of claim 21, wherein the both the detachable portion of the transaction card assembly and the panel assembly comprise structure defining a hanging aperture, and wherein the transaction card assembly is positioned between the at least two panels such that the hanging aperture of the detachable portion of the transaction card assembly and the panel assembly are aligned.

28. The transaction card and carrier system of claim 21, wherein the hanging aperture of the detachable portion of the transaction card assembly is larger than the hanging aperture of the panel assembly, and wherein the at least two panels are secured together within a perimeter of the hanging aperture of the detachable portion of the transaction card assembly, thereby anchoring the transaction card assembly in the panel assembly.

* * * * *